United States Patent
Shijo et al.

(10) Patent No.: US 9,132,391 B2
(45) Date of Patent: Sep. 15, 2015

(54) AIR POLLUTION CONTROL DEVICE

(75) Inventors: Rikuma Shijo, Tokyo (JP); Nobuyasu Sakata, Tokyo (JP); Kiyonori Kushioka, Tokyo (JP); Moritoshi Murakami, Tokyo (JP); Nobuyuki Ukai, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 658 days.

(21) Appl. No.: 13/388,496

(22) PCT Filed: Aug. 5, 2010

(86) PCT No.: PCT/JP2010/063672
§ 371 (c)(1),
(2), (4) Date: Feb. 2, 2012

(87) PCT Pub. No.: WO2011/016584
PCT Pub. Date: Feb. 10, 2011

(65) Prior Publication Data
US 2012/0128540 A1    May 24, 2012

(30) Foreign Application Priority Data

Aug. 5, 2009  (JP) ................ 2009-182709
Dec. 8, 2009  (JP) ................ 2009-278759

(51) Int. Cl.
*B01D 53/50*   (2006.01)
*B01D 53/56*   (2006.01)
(Continued)

(52) U.S. Cl.
CPC .......... *B01F 3/04049* (2013.01); *B01D 53/501* (2013.01); *B01D 53/64* (2013.01);
(Continued)

(58) Field of Classification Search
CPC ...... B01D 53/501; B01D 53/64; B01D 53/75; B01D 53/8625; B01D 53/8665; B01D 53/90; B01F 3/04049; B01F 5/0451; B01F 5/0453; B01F 5/0456; B01F 5/0461; B01F 5/0616; F23J 15/02

USPC ................ 422/168, 172, 176, 220; 138/39; 366/337, 338
See application file for complete search history.

(56) References Cited

U.S. PATENT DOCUMENTS 3,597,166 A * 8/1971 Hochman .............. 422/220
4,830,792 A   5/1989 Wilhelm
(Continued)

FOREIGN PATENT DOCUMENTS

CN   1045709 A   10/1990
CN   2616279 Y   5/2004
(Continued)

OTHER PUBLICATIONS

Chinese Office Action dated Oct. 15, 2013, issued in corresponding Chinese Patent Application No. 201080034446.6, w/ English translation.
(Continued)

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

An air pollution control device is an air pollution control device for reducing the amounts of NOx and Hg contained in flue gas 12 from a boiler 11. The air pollution control device includes: NH$_4$Cl solution supply means 16 for spraying an NH$_4$Cl solution 14 by a spray nozzle 15 into a flue gas duct 13 at the downstream of the boiler 11; a mixer 17 provided on the downstream side of a region where NH$_4$Cl is gasified, for promoting mixing, with the flue gas 12, HCl and NH$_3$ which are generated when NH$_4$Cl is gasified; a reduction-denitration device 18 including a denitration catalyst for reducing NOx in the flue gas 12 with NH$_3$ and for oxidizing Hg under the coexistence with HCl; and a wet desulfurization device 22 for reducing the amount of Hg oxidized in the reduction-denitration device 18 using a limestone-gypsum slurry 21.

5 Claims, 23 Drawing Sheets

(51) Int. Cl.
*B01F 3/04* (2006.01)
*B01D 53/64* (2006.01)
*B01D 53/75* (2006.01)
*B01D 53/86* (2006.01)
*B01D 53/90* (2006.01)
*B01F 5/04* (2006.01)
*B01F 5/06* (2006.01)
*F23J 15/02* (2006.01)

(52) U.S. Cl.
CPC ............ *B01D 53/75* (2013.01); *B01D 53/8625* (2013.01); *B01D 53/8665* (2013.01); *B01D 53/90* (2013.01); *B01F 5/0451* (2013.01); *B01F 5/0453* (2013.01); *B01F 5/0456* (2013.01); *B01F 5/0461* (2013.01); *B01F 5/0616* (2013.01); *F23J 15/02* (2013.01); *B01D 2251/2062* (2013.01); *B01D 2251/404* (2013.01); *B01D 2251/502* (2013.01); *B01D 2251/606* (2013.01); *B01D 2257/602* (2013.01); *F23J 2215/60* (2013.01)

(56) References Cited

U.S. PATENT DOCUMENTS

| | | | | |
|---|---|---|---|---|
| 5,043,146 | A | * | 8/1991 | Ishikawa et al. ............ 422/176 |
| 5,158,712 | A | | 10/1992 | Wilhelm |
| 5,680,884 | A | * | 10/1997 | Nishijima et al. ............ 366/337 |
| 6,638,485 | B1 | * | 10/2003 | Iida et al. ...................... 423/210 |
| 7,581,387 | B2 | * | 9/2009 | Bui et al. ........................ 60/286 |
| 7,906,090 | B2 | * | 3/2011 | Ukai et al. .................... 422/168 |
| 2002/0081241 | A1 | * | 6/2002 | Sigling ......................... 422/172 |
| 2005/0002841 | A1 | * | 1/2005 | Moberg ........................ 423/235 |
| 2005/0172615 | A1 | | 8/2005 | Mahr |
| 2010/0183493 | A1 | | 7/2010 | Nochi et al. |

FOREIGN PATENT DOCUMENTS

| | | |
|---|---|---|
| CN | 1706554 A | 12/2005 |
| CN | 1895744 A | 1/2007 |
| CN | 201108807 Y | 9/2008 |
| CN | 101281698 A | 10/2008 |
| CN | 101342462 A | 1/2009 |
| CN | 201200860 Y | 3/2009 |
| DE | 195 39 923 C1 | 6/1997 |
| EP | 0 321 379 * | 6/1989 |
| EP | 0 659 477 A1 | 6/1995 |
| EP | 1 681 090 A1 | 7/2006 |
| EP | 1 894 616 * | 3/2008 |
| JP | 7-9428 U | 2/1995 |
| JP | 10-230137 A | 9/1998 |
| JP | 2001-252545 A | 9/2001 |
| JP | 2004-510909 A | 4/2004 |
| JP | 2007-167743 A | 7/2007 |
| JP | 2008-221087 A | 9/2008 |
| JP | 2009-154067 A | 7/2009 |
| WO | 2009/081600 A1 | 7/2009 |

OTHER PUBLICATIONS

Notice of Allowance dated Nov. 7, 2013, issued in corresponding Canadian application No. 2,769,465.

Japanese Decision of a Patent Grant dated Mar. 11, 2014, issued in corresponding Japanese Patent Application No. 2009-278759 with English translation (3 pages).

Extended European Search Report dated Dec. 13, 2012, issued in corresponding European Patent Application No. 10806581.4 (8 pages).

International Search Report of PCT/JP2010/063672, mailing date of Oct. 19, 2010.

Written Opinion of the International Searching Authority of PCT/JP2010/063672, mailing date of Oct. 19, 2010.

Chinese Office Action dated Jun. 26, 2014, issued in corresponding Chinese Patent Application No. 201080034446.6, w/English Translation (29 pages).

Notice of Acceptance dated Jun. 3, 2015, issued in corresponding Chinese Patent Application No. 201080034446.6 with English translation (4 pages).

* cited by examiner

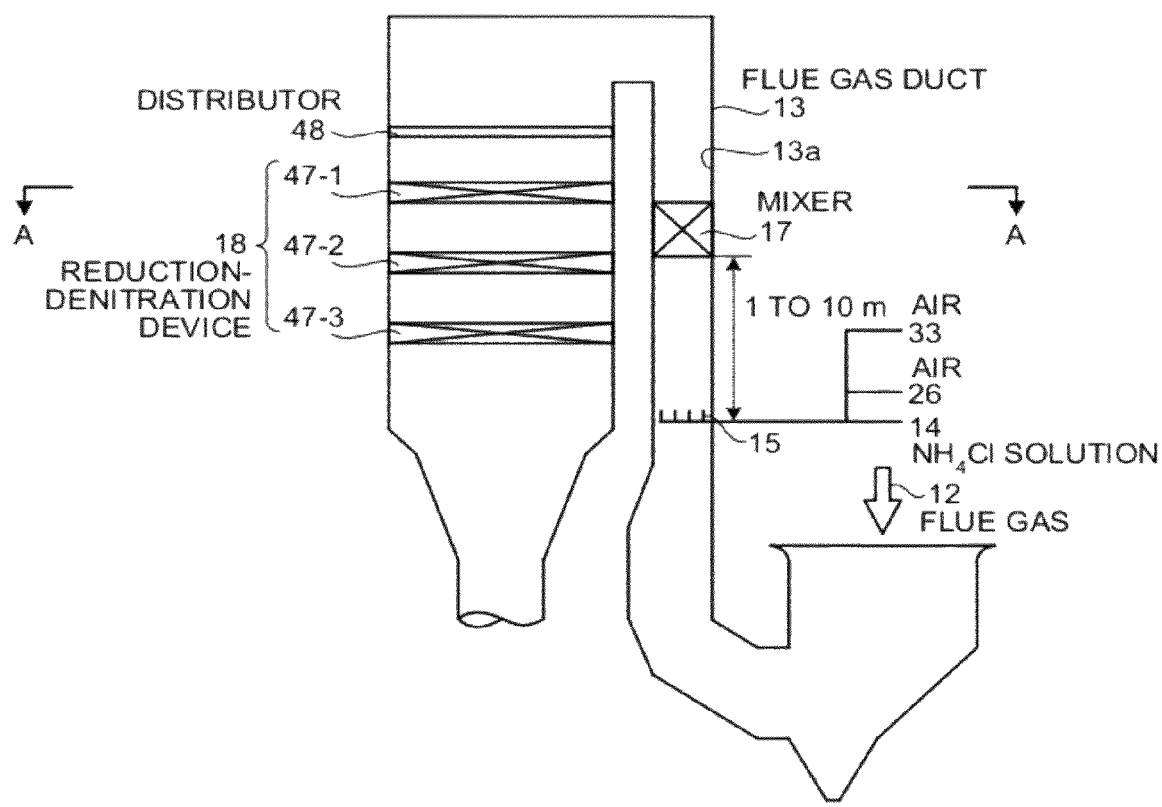

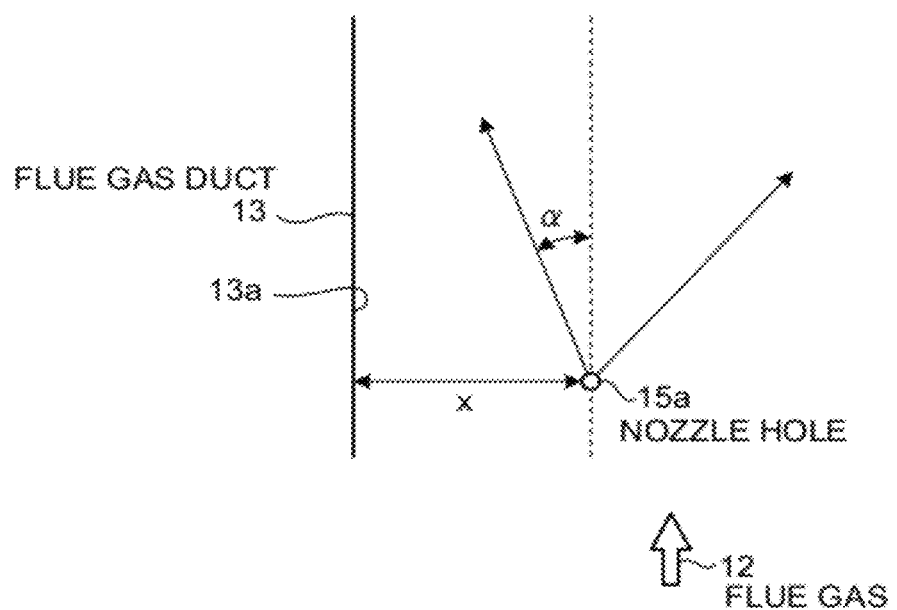

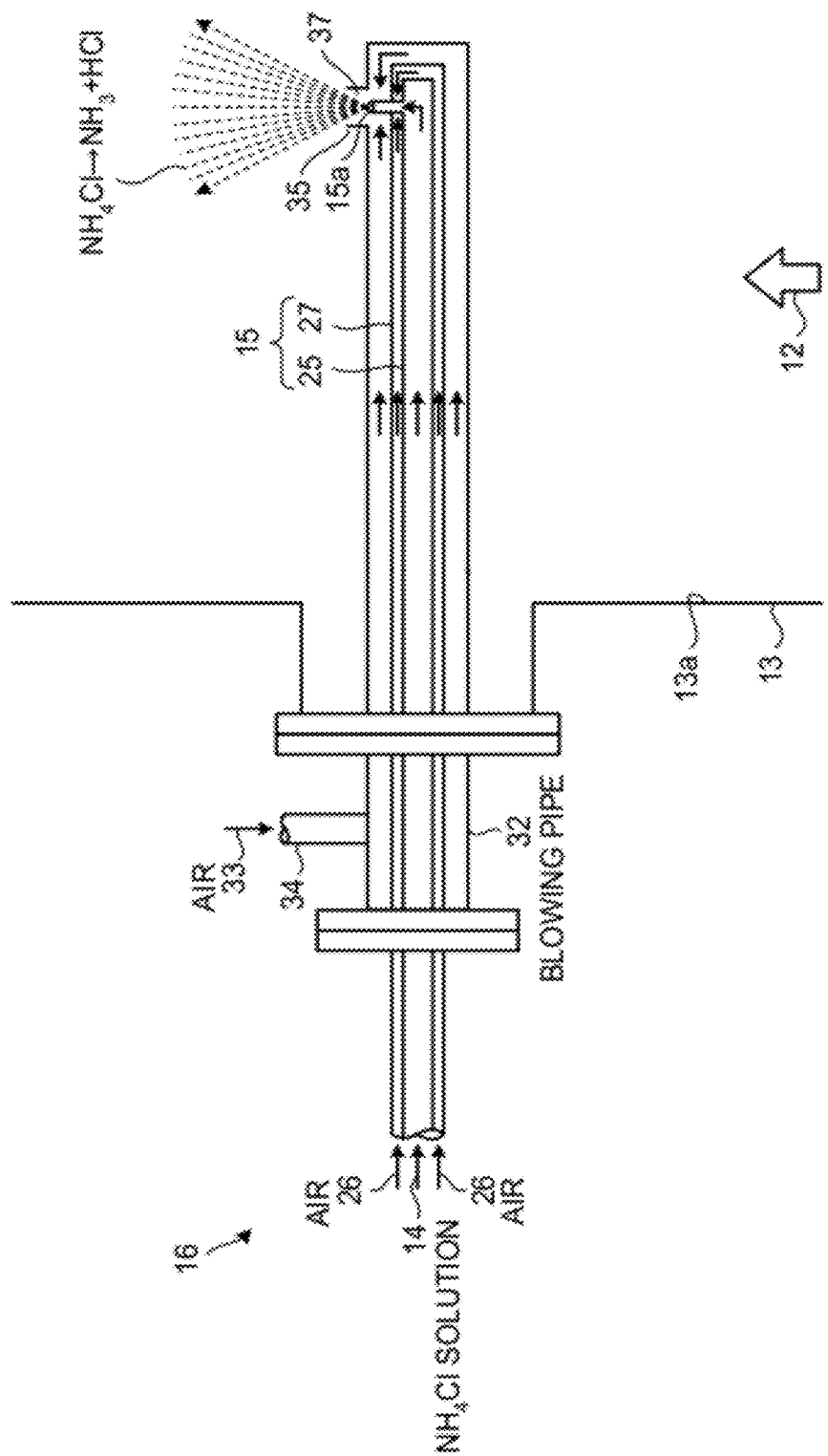

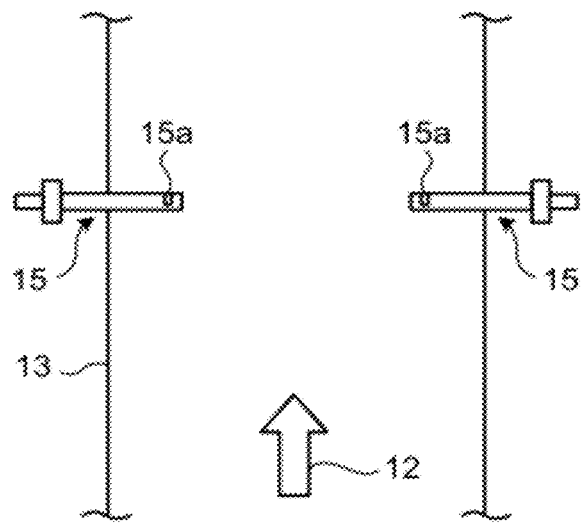
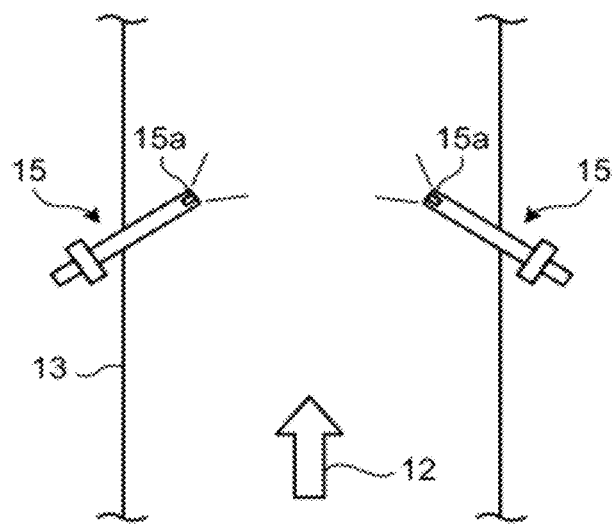

AIR POLLUTION CONTROL DEVICE

FIELD

The present invention relates to an air pollution control device for performing an oxidation treatment of mercury contained in a flue gas discharged from a boiler or the like.

BACKGROUND

A coal combustion flue gas or flue gas generated when burning heavy oil sometimes contains metallic mercury ($Hg^0$) in addition to soot and dust, sulfur oxides (SOx), and nitrogen oxides (NOx). In recent years, various methods and devices for treating this metallic mercury have been devised in combination with a denitration device for reducing NOx and a wet desulfurization device using an alkali absorbent as an SOx absorbent.

As a method for treating metallic mercury in a flue gas, there has been suggested a system in which an ammonium ($NH_3$) solution is sprayed in a flue gas duct on an upstream side of a high-temperature denitration device so as to perform reduction and denitration; an oxidation auxiliary agent such as a hydrochloric acid (HCl) solution is also sprayed so as to oxidize (chlorinate) mercury on a denitration catalyst to obtain a water-soluble mercury chloride; and the amount of mercury is then reduced by a wet desulfurization device disposed on a downstream side (for example, see Patent Literature 1).

Moreover, as a method for supplying HCl, there has been a method in which a hydrochloric acid (HCl) solution is vaporized using a hydrogen chloride (HCl) carburetor to obtain a hydrogen chloride (HCl) gas; and after adjusting it to a mixed gas containing HCl with a predetermined concentration, the mixed gas is dispersed into a flue gas duct so as to be sprayed evenly into a flue gas containing mercury (for example, see Patent Literature 2).

Moreover, as another method for supplying HCl, there has been a method in which powdered ammonium chloride ($NH_4Cl$) is added in a flue gas duct on an upstream side of a denitration device; $NH_4Cl$ is sublimed by a high ambient temperature of a flue gas, so that HCl and ammonia ($NH_3$) are gasified respectively; and the gasified HCl gas and $NH_3$ gas are mixed with the flue gas (for example, see Patent Literature 3).

With the methods for treating metallic mercury in a flue gas as described above, when a hydrochloric acid solution is used, there is a problem that great care and cost are required in its transportation, handling, and the like since hydrochloric acid is a dangerous substance. Moreover, when the HCl carburetor is used, steam or the like is required as a heat source. Thus, there is a problem that costs for the facility, operation, maintenance, and the like of the HCl carburetor and the like are required. Furthermore, when $NH_4Cl$ powders are used, a particle diameter thereof needs to be reduced for the dispersion thereof. Thus, there is a problem that the handling thereof is difficult and control for the sprayed amount thereof is not easy.

CITATION LIST

Patent Literature

Patent Literature 1: Japanese Patent Application Laid-Open No. Hei. 10-230137
Patent Literature 2: Japanese Patent Application Laid-Open No. 2007-167743
Patent Literature 3: Japanese Patent Application Laid-Open No. 2008-221087

SUMMARY

Technical Problem

In view of this, in order to oxidize $Hg^0$ with a denitration catalyst, there has been studied a method for spraying an ammonium chloride ($NH_4Cl$) solution on an upstream side of a denitration device in recent years. As compared to the method using a hydrochloric acid solution as in the conventional technique, dangerousness of the $NH_4Cl$ solution is small, and the transportation and handling thereof are therefore easy. Furthermore, since there is no need for the facility such as a carburetor for spraying a liquid, the cost can be reduced.

A schematic diagram of an air pollution control system for the flue gas discharged from a boiler is shown in FIG. 34. As shown in FIG. 34, an air pollution control system 100 includes: an $NH_4Cl$ spray device 105 for spraying an $NH_4Cl$ solution 103 into the flue gas 102 in a flue gas duct 104, the flue gas 102 containing NOx and $Hg^0$ discharged from a boiler 101 for supplying coal as a fuel; a reduction-denitration device 106 including a denitration catalyst for reducing NOx and oxidizing $Hg^0$; and a desulfurization device 107 for reducing the amount of oxidized HgCl in the flue gas 102. The $NH_4Cl$ solution 103 is sprayed from an $NH_4Cl$ solution tank 108 into the flue gas 102 discharged from the boiler 101 by spray nozzles 109. The $NH_4Cl$ solution 103 is gasified, so that an $NH_3$ gas and an HCl gas are mixed with the flue gas 102. Thereafter, the flue gas 102 is supplied to the reduction-denitration device 106 to perform NOx reduction and $Hg^0$ oxidation by a denitration catalyst in the reduction-denitration device 106. Then, the flue gas 102 after the removal of NOx is heat-exchanged with air 111 by an air preheater (air heater) 110 to recover heat. Then, the flue gas 102 is supplied to an electronic precipitator 112, and soot and dust in the flue gas 102 after the heat recovery are removed. The flue gas 102 is supplied to the desulfurization device 107, brought into gas-liquid contact with a gypsum stone slurry 113 which is supplied to the desulfurization device 107 to reduce the amounts of SOx and Hg, and discharged to the outside as a purged gas 114 from a stack 115.

Moreover, an NOx concentration in the flue gas 102 is measured by an NOx meter 116 disposed on the upstream side of the reduction-denitration device 106 in the flue gas duct 104, and an Hg concentration is measured by an Hg concentration meter 117 disposed on the downstream side of the desulfurization device 107. Based on the measured values of the measured NOx concentration and Hg concentration, a supply amount and a concentration of the $NH_4Cl$ solution 103 to be supplied from the $NH_4Cl$ solution tank 108 are calculated by an arithmetic unit 118. Based on the calculated supply amount and concentration of the $NH_4Cl$ solution 103, a supply amount of the $NH_4Cl$ solution 103 to be supplied into the flue gas duct 104 is controlled by control means 119.

Moreover, an oxidation-reduction potential is measured by an oxidation-reduction potential measurement device 120 disposed at a bottom portion of the desulfurization device 107 and a supply amount of air 121 is adjusted, thereby preventing the reduction and spread of the mercury oxide.

As described above, the $NH_4Cl$ solution 103 is supplied into the flue gas 102, and accordingly, the amount of NOx in the flue gas 102 can be reduced and Hg can be oxidized.

Here, according to the air pollution control system 100 shown in FIG. 34, when spraying the $NH_4Cl$ solution 103, if the $NH_4Cl$ solution 103 is adhered to a wall surface of the flue gas duct 104 or a structure in the flue gas duct 104 before the gasification thereof, there is a possibility for a breakage or the like due to corrosion, deposition of ash, and heat shock. Thus, as shown in FIG. 35, the spray nozzles 109 need to be disposed at positions with a certain distance away from a wall surface edge of the flue gas duct 104.

However, if the spray nozzles 109 are sprayed from the positions with a certain distance away from the wall edge of the flue gas duct 104, the $NH_4Cl$ solution 103 cannot be sprayed into the flue gas duct 104 evenly. Therefore, the $NH_3$ concentration after the gasification of $NH_3$ and HCl produced from the $NH_4Cl$ solution 103 becomes uneven, resulting in a problem that the denitration ability is deteriorated.

In view of the above-described problems, an object of the present invention is to provide an air pollution control device capable of evenly supplying a reducing agent and a mercury chlorinating agent into a flue gas duct without concentration unevenness and capable of maintaining the mercury removal ability and the nitrogen oxide reducing ability.

Solution to Problem

In order to solve the above-described problems, the following configurations can be employed. According to an aspect of the present invention, an air pollution control device for reducing amounts of a nitrogen oxide and mercury contained in a flue gas from a boiler includes: a reduction-oxidation auxiliary agent supply unit for spraying in a liquid state a reduction-oxidation auxiliary agent that produces an oxidizing gas and a reducing gas upon gasification thereof into a flue gas duct at a downstream of the boiler; a mixing unit provided on a downstream side of a region where the reduction-oxidation auxiliary agent is gasified, for promoting mixing of the oxidizing gas and the reducing gas, which are produced upon the gasification of the reduction-oxidation auxiliary agent, with the flue gas; a reduction-denitration unit including a denitration catalyst for reducing a nitrogen oxide in the flue gas with the reducing gas and for oxidizing mercury under coexistence with the oxidizing gas; and a wet desulfurization unit for reducing the amount of mercury oxidized in the reduction-denitration unit using an alkali absorbent.

Advantageously, in the air pollution control device, the reduction-oxidation auxiliary agent is ammonium chloride.

Advantageously, in the air pollution control device, the mixing unit includes a unit including a plurality of swirling flow inductive members for generating a swirling flow in the flue gas, the swirling flow inductive members being disposed so as to be perpendicular to a flow direction of the flue gas.

Advantageously, in the air pollution control device, the mixing unit is formed by providing a plurality of the units in the flow direction of the flue gas.

Advantageously, in the air pollution control device, the swirling flow inductive member includes: a pair of first swirling flow inductive plates having opposed surfaces on an inlet side of the flue gas; and a pair of second swirling flow inductive plates having opposed surfaces on a discharge side of the flue gas, and at a connecting portion to which the first swirling flow inductive plate and the second swirling flow inductive plate are connected, the first swirling flow inductive plate and the second swirling flow inductive plate are connected thereto so that the opposed surfaces thereof are directed differently.

Advantageously, in the air pollution control device, a width L and a height D of the swirling flow inductive member are within ranges defined by the following expressions:

$$MIN(B,H)/10 \leq L \leq MIN(B,H) \quad (1)$$

$$MIN(B,H)/10 \leq D \leq 5 \times MIN(B,H) \quad (2)$$

where B denotes a length of one side in a cross-section of the flue gas duct at an installation position thereof, H denotes a length of the other side in the cross-section of the flue gas duct, and MIN(B,H) denotes a value of a length of a shorter side of the length B of the one side in the cross-section of the flue gas duct and the length H of the other side in the cross-section of the flue gas duct.

Advantageously, in the air pollution control device, the mixing unit is a spreading and swirling plate provided in the flue gas duct and formed in a flat plate shape on an upstream side in a gas flow of the flue gas in the flue gas duct and formed in a corrugated shape toward a downstream side in the gas flow of the flue gas, and the spreading and swirling plate is formed in such a way that an amplitude of the corrugated shape is increased toward the downstream side in the gas flow of the flue gas.

Advantageously, in the air pollution control device, further includes one of or both of an ammonia gas supply unit for supplying an ammonia gas into the flue gas duct and a hydrogen chloride gas supply unit for supplying a hydrogen chloride gas into the flue gas duct, which are provided between the reduction-oxidation auxiliary agent supply unit and the reduction-denitration unit.

To further solve the above-described problems, the following configurations can be further employed.

9) That is, the spray nozzles may supply the reduction-oxidation auxiliary agent so as to prevent the reduction-oxidation auxiliary agent from being adhered to an inner wall of a flue gas duct through which the flue gas flows.

10) Based on a moved distance 1 over which a droplet is moved before the evaporation thereof, which is obtained at least from the gas flow velocity, the initial velocity of the droplet, the droplet diameter, the flue gas temperature, and the droplet temperature, and a jet angle $\alpha$, the spray nozzle may be disposed so that a shortest distance x from the inner wall of the flue gas duct to a nozzle hole of the spray nozzle satisfies the following expression, $$x > l \times \sin \alpha \quad (3).$$

11) The nozzle hole of the spray nozzle may be provided at a position 0.5 m or longer away from the wall surface of the flue gas duct.

12) When a plurality of spray nozzles are provided within the flue gas duct, the plurality of spray nozzles may be disposed so as to satisfy the following expression, $$a \leq b/5 \quad (4)$$

Note however that a denotes a distance between nozzle holes of the spray nozzle, and b denotes a long side length out of lengths of a cross-section of the flue gas duct.

13) The spray nozzle may have a plurality of nozzle holes for spraying the reduction-oxidation auxiliary agent.

14) When the spray nozzle has the plurality of nozzle holes for spraying the reduction-oxidation auxiliary agent, a distance between the nozzle holes may be set to 0.3 m or shorter.

15) When the plurality of spray nozzles are provided within the flue gas duct, respective sprayed amounts from the spray nozzles may be changed.

16) The flue gas duct may include a protruding member provided on the inner wall of the flue gas duct on the downstream side of a supply position at which the reduction-oxidation auxiliary agent is supplied into the flue gas duct.

17) The flue gas duct may include a narrowed portion for narrowing a passage in the flue gas duct on the downstream side of the supply position at which the reduction-oxidation auxiliary agent is supplied into the flue gas duct.

18) A guide vane provided on the upstream side of the reduction-denitration means may be provided with a mixing promoting auxiliary member for promoting the mixing of the gasified oxidizing gas and reducing gas into the flue gas.

19) The spray nozzle may be a two-fluid nozzle for jetting the reduction-oxidation auxiliary agent and air for spraying the reduction-oxidation auxiliary agent.

20) A flow rate measurement device for measuring a flow velocity of the flue gas may be provided on the upstream side of the supply position at which the reduction-oxidation auxiliary agent is supplied.

21) It is a flue gas mercury reducing method for reducing amounts of a nitrogen oxide and mercury contained in the flue gas from a boiler, and the method may include the following steps:

a reduction-oxidation auxiliary agent supplying step for spraying, in a liquid state, a reduction-oxidation auxiliary agent, which produces an oxidizing gas and a reducing gas upon the gasification thereof, into a flue gas duct of the boiler by a spray nozzle;

a mixing step for promoting mixing of the oxidizing gas and the reducing gas produced upon the gasification of the reduction-oxidation auxiliary agent with the flue gas on a downstream side of a region where the reduction-oxidation auxiliary agent is gasified;

a reduction-denitration treatment step for reducing the nitrogen oxide in the flue gas with the reducing gas and oxidizing mercury under the coexistence with the oxidizing gas using a denitration catalyst; and a wet desulfurization step for reducing an amount of mercury oxidized in the reduction-denitration treatment step using an alkali absorbent.

22) Ammonium chloride may be used as the reduction-oxidation auxiliary agent.

23) A flow rate measurement step for measuring a flow velocity of the flue gas may be further included on the upstream side of the supply position at which the reduction-oxidation auxiliary agent is supplied, and based on the measured flow velocity of the flue gas, a sprayed amount, a spray angle, and a spray initial velocity of the reduction-oxidation auxiliary agent may be adjusted.

24) A nitrogen oxide concentration measurement step for measuring a nitrogen oxide concentration in the flue gas may be included on a pre-step side of the reduction-denitration treatment step, and a mercury concentration measurement step for measuring a mercury concentration in the flue gas may be included on a post-step side of the reduction-denitration treatment step. Then, based on one of or both of the nitrogen oxide concentration in the flue gas obtained by the nitrogen oxide concentration measurement step and the mercury concentration in the flue gas obtained by the mercury concentration measurement step, a supply amount of the reduction-oxidation auxiliary agent to be supplied in the reduction-oxidation auxiliary agent supplying step may be adjusted.

25) One of or both of an ammonia gas supplying step for supplying an ammonia gas into the flue gas duct and a hydrogen chloride gas supplying step for supplying a hydrogen chloride gas into the flue gas duct may be included between the reduction-oxidation auxiliary agent supplying step and the reduction-denitration treatment step. Based on the flow velocity of the flue gas measured by the flow rate measurement step, the sprayed amount, spray angle, and spray initial velocity of one of or both of the ammonia gas supplied by the ammonia gas supplying step and the hydrogen chloride gas supplied by the hydrogen chloride gas supplying step may be adjusted.

Advantageous Effects of Invention

According to the present invention, the mixing of the oxidizing gas and the reducing gas, which are generated upon the gasification of the reduction-oxidation auxiliary agent, with the flue gas on the downstream side of the region where the reduction-oxidation auxiliary agent is gasified is promoted. Therefore, the oxidizing gas and the reducing gas can be evenly supplied into the flue gas duct without concentration unevenness. Thus, it is possible to possess a mercury oxidation ability and maintain a nitrogen oxide reducing ability in the reduction-denitration device. It is also possible to prevent a breakage of the flue gas duct or a structure in the flue gas duct due to heat shock, corrosion, deposition of ash in the flue gas, and the like from occurring.

BRIEF DESCRIPTION OF DRAWINGS

FIG. 2 is a diagram showing part of the configuration of the air pollution control device.

FIG. 3 is a diagram illustrating a jet angle of an $NH_4Cl$ solution sprayed from a spray nozzle with respect to a flue gas duct.

FIG. 4 is a diagram showing an example of the configuration of $NH_4Cl$ solution supply means.

FIG. 5 is a diagram showing an example of insertion of the spray nozzles into the flue gas duct.

FIG. 6 is a diagram showing another example of insertion of the spray nozzles into the flue gas duct.

DESCRIPTION OF EMBODIMENTS

The present invention will be described below in detail with reference to the drawings. Note that the present invention is not limited by those embodiments. Moreover, constituent elements in the following embodiments include those which can be conceived easily by those skilled in the art or those substantially the same.

First Embodiment

An air pollution control device according to a first embodiment of the present invention will be described with reference to the drawings.

Figure 1:
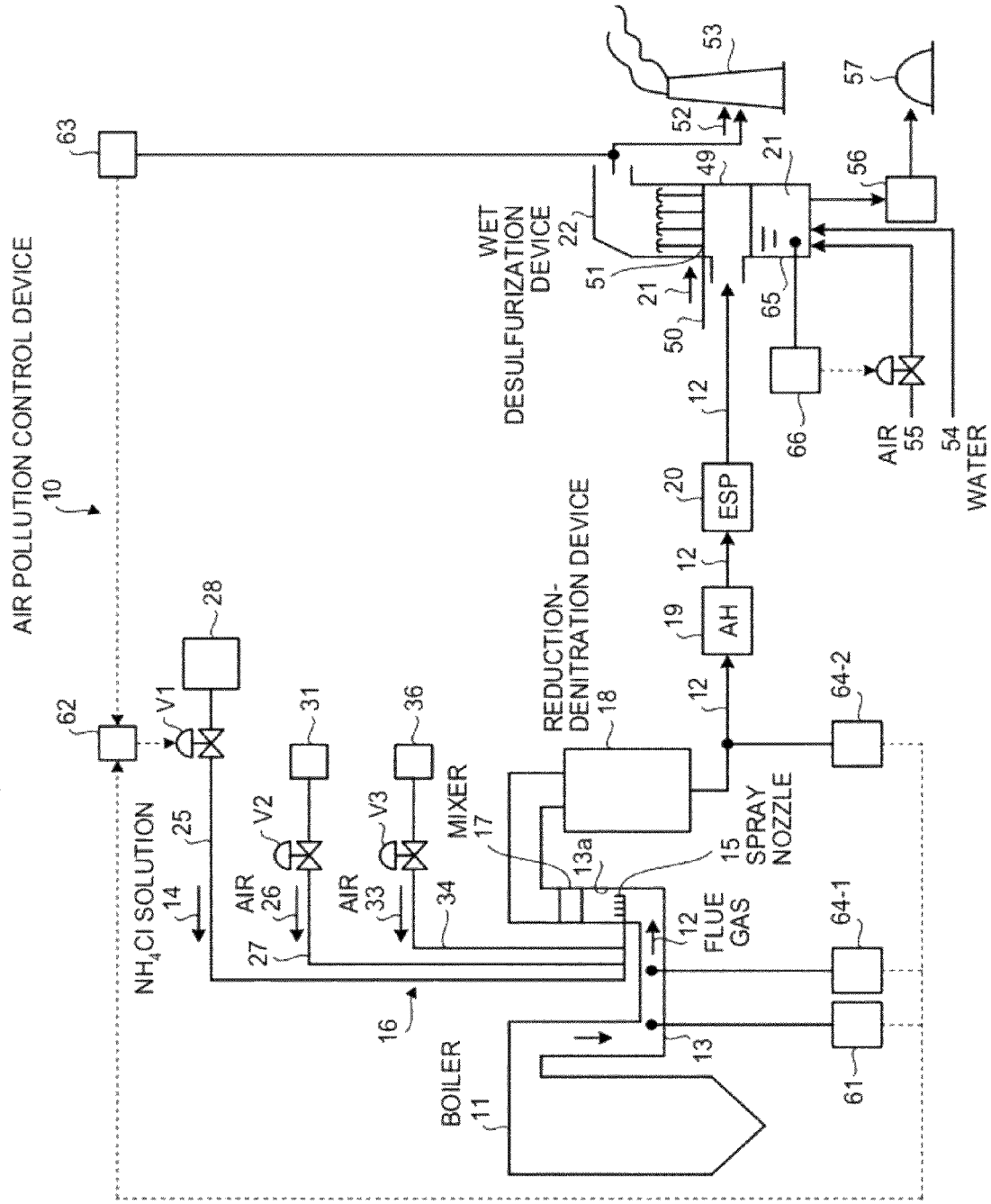
FIG. 1 is a schematic diagram showing the configuration of an air pollution control device according to a first embodiment of the present invention.

FIG. 1 is a schematic diagram showing the configuration of the air pollution control device according to the first embodiment of the present invention. FIG. 2 is a diagram showing part of the configuration of the air pollution control device.

As shown in FIGS. 1 and 2, an air pollution control device 10 according to the present embodiment is an air pollution control device for reducing the amounts of nitrogen oxide (NOx) and mercury (Hg) contained in flue gas 12 from a boiler 11. The device 10 includes: ammonium chloride ($NH_4Cl$) solution supply means (reduction-oxidation auxiliary agent supply means) 16 for spraying, in a liquid state, an ammonium chloride ($NH_4Cl$) solution 14 containing ammonium chloride ($NH_4Cl$) as a reduction-oxidation auxiliary agent by a spray nozzle 15 in a flue gas duct 13 at the downstream of the boiler 11; a mixer (mixing means) 17, which is provided on the downstream side of a region where $NH_4Cl$ is gasified, for promoting mixing, with the flue gas 12, hydrogen chloride (HCl) gas as an oxidizing gas and ammonia ($NH_3$) gas as a reducing gas which are produced when $NH_4Cl$ is gasified; a reduction-denitration device (reduction-denitration means) 18 including a denitration catalyst for reducing NOx in the flue gas 12 with an $NH_3$ gas and for oxidizing Hg under the coexistence with an HCl gas; a heat exchanger (air heater) 19 for performing heat-exchange of the denitrated flue gas 12; a precipitator 20 for reducing the amounts of soot and dust in the denitrated flue gas 12; and a wet desulfurization device 22 for reducing the amount of the Hg oxidized in the reduction-denitration device 18 using a limestone-gypsum slurry 21 as an alkali absorbent.

Note that although $NH_4Cl$ is used as a reduction-oxidation auxiliary agent in the air pollution control device 10 according to the present embodiment, the present invention is not limited thereto. Any reduction-oxidation auxiliary agent can be used as long as it generates an oxidizing gas and a reducing gas when gasified.

Moreover, the reduction-oxidation auxiliary agent used in the present invention refers to one functioning as an oxidation auxiliary agent used for oxidizing mercury (Hg) under the coexistence with an oxidizing gas and a reducing agent for reducing NOx by a reducing gas. In the present embodiment, the HCl gas is used as the oxidizing gas, and the $NH_3$ gas is used as the reducing gas.

The $NH_4Cl$ solution 14 is supplied to the flue gas 12 discharged from the boiler 11 by the $NH_4Cl$ solution supply means 16. The $NH_4Cl$ solution supply means 16 includes the spray nozzle 15. The spray nozzle 15 includes: an ammonium chloride ($NH_4Cl$) solution supply pipe 25 for supplying the $NH_4Cl$ solution 14 in a liquid state to the inside of the flue gas duct 13; and an air supply pipe 27 for supplying, to the inside of the flue gas duct 13, air 26 for compressing and spraying the $NH_4Cl$ solution 14 into the flue gas duct 13, and is composed of a two-fluid nozzle. The spray nozzle 15 includes nozzle holes for simultaneously jetting the $NH_4Cl$ solution 14 and the air 26 at tip portions of the $NH_4Cl$ solution supply pipe 25 and the air supply pipe 27.

The $NH_4Cl$ solution 14 is adjusted within an ammonium chloride ($NH_4Cl$) solution tank 28 to have a predetermined concentration. Moreover, a flow rate of the $NH_4Cl$ solution 14 supplied from the $NH_4Cl$ solution supply pipe 25 is adjusted by a valve V1. The $NH_4Cl$ solution 14 passes through the $NH_4Cl$ solution supply pipe 25 from the $NH_4Cl$ solution tank 28 and is sprayed into the flue gas duct 13 from the spray nozzle 15.

The $NH_4Cl$ solution supply means 16 includes the spray nozzle 15 disposed in such a way that the $NH_4Cl$ solution 14 is supplied so as to prevent the $NH_4Cl$ solution 14 from being adhered to an inner wall 13a of the flue gas duct 13 through which the flue gas 12 is flowing. A preferred arrangement for supplying the $NH_4Cl$ solution 14 while preventing the $NH_4Cl$ solution 14 from being adhered to the inner wall 13a of the flue gas duct 13 through which the flue gas 12 flows is a configuration in which the spray nozzle 15 is disposed inside the flue gas duct 13 with a certain distance or longer away from the inner wall 13a of the flue gas duct 13. A certain distance or longer refers to a distance sufficient for a droplet of the sprayed $NH_4Cl$ solution 14 to be gasified before reaching to the inner wall 13a of the flue gas duct 13 from the nozzle hole of the spray nozzle 15. In view of the actual dimension of the flue gas duct and the actual treatment conditions, it is preferable that the nozzle hole of the spray nozzle 15 be provided at a position 0.5 m or longer away from a wall surface of the flue gas duct 13, for example.

The reason why the position of the nozzle hole of the spray nozzle 15 is set to the position 0.5 m or longer away from the wall surface of the flue gas duct 13 is that it is necessary to take into consideration a gas flow velocity of the flue gas 12, an initial velocity of a droplet of the $NH_4Cl$ solution 14 sprayed from the spray nozzle 15, a droplet diameter, a jet angle of the $NH_4Cl$ solution 14 sprayed from the spray nozzle 15 with respect to the flue gas duct 13, a flue gas temperature of the flue gas 12, a droplet temperature of the $NH_4Cl$ solution 14, and the like as will be shown below. In one example thereof, it can be determined as follows, for example.

That is, when the gas flow velocity of the flue gas 12 inside the flue gas duct 13 is about 15 m/s, the initial velocity of the droplet of the $NH_4Cl$ solution 14 sprayed from the spray nozzle 15 is about 300 m/s, the gas temperature of the flue gas 12 is about 350° C., and the droplet temperature of the $NH_4Cl$ solution 14 is about 20° C., an estimated amount of time it takes for a droplet of the $NH_4Cl$ solution 14 to be evaporated after being sprayed and an estimated moved distance over which a droplet of the $NH_4Cl$ solution 14 is moved before the evaporation thereof vary depending on the droplet diameter of the $NH_4Cl$ solution 14.

Examples of a relationship among a droplet diameter of the $NH_4Cl$ solution 14, an amount of time it takes for a droplet to be evaporated after being sprayed, and a moved distance over which a droplet is moved before the evaporation thereof are shown in Table 1. In Table 1, t represents an amount of time it takes for a droplet of the $NH_4Cl$ solution 14 to be evaporated after being sprayed, and l represents a moved distance over which a droplet is moved before the evaporation thereof.

TABLE 1

| DROPLET DIAMETER (μm) | AMOUNT OF TIME FROM SPRAY TO EVAPORATION t (s) | MOVE DISTANCE OVER WHICH DROPLET MOVES BEFORE EVAPORATION l (m) |
|---|---|---|
| 40 | 0.032 | 0.76 |
| 60 | 0.068 | 1.6 |
| 80 | 0.119 | 2.7 |

As shown in Table 1, when the droplet diameter of the $NH_4Cl$ solution 14 is about 40 μm, the amount of time t it takes for this droplet to be evaporated after being sprayed is about 0.032 s, and the moved distance l over which the droplet of the $NH_4Cl$ solution 14 is moved before the evaporation thereof is calculated to be about 0.76 m from the spray nozzle 15 in a direction parallel to the flow of the flue gas 12. Also, when the droplet diameter of the $NH_4Cl$ solution 14 is about 60 μm, the amount of time t it takes for this droplet to be evaporated after being sprayed is about 0.068 s, and the moved distance l over which the droplet of the $NH_4Cl$ solution 14 is moved before the evaporation thereof is calculated to be about 1.6 m from the spray nozzle 15 in the direction parallel to the flow of the flue gas 12. Also, when the droplet diameter of the $NH_4Cl$ solution 14 is about 80 μm, the amount of time t it takes for this droplet to be evaporated after being sprayed is about 0.119 s, and the moved distance l over which the droplet of the $NH_4Cl$ solution 14 is moved before the evaporation thereof is calculated to be about 2.7 m from the spray nozzle 15 in the spraying direction.

Next, a jet angle of the $NH_4Cl$ solution 14 sprayed from the spray nozzle 15 with respect to the flue gas duct 13 will be examined. FIG. 3 is a diagram illustrating a jet angle of the $NH_4Cl$ solution sprayed from the spray nozzle with respect to the flue gas duct. In FIG. 3, α denotes a jet angle of a droplet of the $NH_4Cl$ solution 14 sprayed from a nozzle hole 15a of the spray nozzle 15 with respect to a wall surface of the flue gas duct 13, and x denotes a shortest distance from the inner wall 13a of the flue gas duct 13 to the nozzle hole 15a of the spray nozzle 15.

As shown in FIG. 3, the spray nozzle 15 is disposed so as to satisfy the following expression (i) in accordance with the jet angle α of a droplet of the $NH_4Cl$ solution 14 sprayed from the nozzle hole 15a of the spray nozzle 15 with respect to the wall surface of the flue gas duct 13, and accordingly, it is possible to prevent the droplet sprayed from the spray nozzle 15 from colliding against the wall surface of the flue gas duct 13.

$$l \times \sin \alpha \leq x \quad (i)$$

Note, however, that l represents a moved distance over which a droplet of the $NH_4Cl$ solution 14 is moved before the evaporation thereof.

Table 2 shows examples of a shortest distance x from the inner wall 13a of the flue gas duct 13 to the nozzle hole 15a of the spray nozzle 15 when a jet angle α of a droplet of the $NH_4Cl$ solution 14 sprayed from the nozzle hole 15a of the spray nozzle 15 with respect to the wall surface of the flue gas duct 13 is about 10° with respect to a gas flow direction of the flue gas 12.

TABLE 2

| DROPLET DIAMETER (μm) | SHORTEST DISTANCE FROM INNER WALL OF FLUE GAS DUCT TO NOZZLE HOLE OF SPRAY NOZZLE x(m) |
|---|---|
| 40 | 0.13 (=0.76 × sin 10°) |
| 60 | 0.28 (=1.6 × sin 10°) |
| 80 | 0.47 (=2.7 × sin 10°) |

As shown in Table 2, when the droplet diameter of the $NH_4Cl$ solution 14 is about 40 μm, the shortest distance x from the inner wall 13a of the flue gas duct 13 to the nozzle hole 15a of the spray nozzle 15 is about 0.13 m. Also, when the droplet diameter of the $NH_4Cl$ solution 14 is about 60 μm, the shortest distance x from the inner wall 13a of the flue gas duct 13 to the nozzle hole 15a of the spray nozzle 15 is about 0.28 m. Also, when the droplet diameter of the $NH_4Cl$ solution 14 is about 80 μm, the shortest distance x from the inner wall 13a of the flue gas duct 13 to the nozzle hole 15a of the spray nozzle 15 is about 0.47 m.

Therefore, when the jet angle α of a droplet of the $NH_4Cl$ solution 14 sprayed from the nozzle hole 15a of the spray nozzle 15 with respect to the wall surface of the flue gas duct 13 is about 10° with respect to a gas flow direction of the flue gas 12, the nozzle hole 15a of the spray nozzle 15 needs to be provided 0.13 m or longer away from the flue gas duct 13 when the droplet diameter of the $NH_4Cl$ solution 14 is about 40 μm. Also, when the droplet diameter of the $NH_4Cl$ solution 14 is about 60 μm, the nozzle hole 15a of the spray nozzle 15 needs to be provided 0.28 m or longer away from the flue gas duct 13. Also, when the droplet diameter of the $NH_4Cl$ solution 14 is about 80 μm, the nozzle hole 15a of the spray nozzle 15 needs to be provided 0.47 m or longer away from the flue gas duct 13.

Therefore, the nozzle hole 15a of the spray nozzle 15 is provided at a position 0.5 m or longer away from the wall surface of the flue gas duct 13, for example. As a result, the nozzle hole 15a of the spray nozzle 15 can be positioned with a sufficient distance for the droplet of the sprayed $NH_4Cl$ solution 14 to be gasified before reaching to the inner wall 13a of the flue gas duct 13 from the spray nozzle 15 depending on the gas flow velocity of the flue gas 12, the initial velocity of a droplet of the $NH_4Cl$ solution 14 sprayed from the nozzle hole 15a of the spray nozzle 15, the droplet diameter, the jet angle of the $NH_4Cl$ solution 14 sprayed from the spray nozzle 15 with respect to the flue gas duct 13, the flue gas temperature of the flue gas 12, the droplet temperature of the $NH_4Cl$ solution 14, and the like. As a result, the spray nozzle 15 can supply the $NH_4Cl$ solution 14 while preventing the $NH_4Cl$ solution 14 from being adhered to the inner wall 13a of the flue gas duct 13 through which the flue gas 12 is flowing.

As described above, the spray nozzle 15 is configured as a two-fluid nozzle for simultaneously jetting the $NH_4Cl$ solution 14 and the air 26 for compression. The air 26 is fed from an air supply unit 31 to the spray nozzle 15 via the air supply pipe 27 and then used as compression air when spraying the $NH_4Cl$ solution 14 from the spray nozzle 15. The air 26 thereby makes it possible to spray the $NH_4Cl$ solution 14 jetted from the spray nozzle 15 in a form of fine droplets in the flue gas duct 13.

Moreover, a flow rate of the air 26 supplied from the air supply pipe 27 is adjusted by a valve V2. The size of a droplet of the $NH_4Cl$ solution 14 sprayed from a nozzle hole of the spray nozzle 15 can be adjusted by the flow rate of the air 26 supplied from the air supply pipe 27.

Moreover, the flow rate of the air 26 jetted from the spray nozzle 15 is preferably in a range of 100 or higher and 10000 or lower in air-water ratio (volume ratio), for example. This is to allow the $NH_4Cl$ solution 14 jetted from the spray nozzle 15 to be sprayed in a form of fine droplets within the flue gas duct 13.

The $NH_4Cl$ solution supply means 16 sprays the $NH_4Cl$ solution 14 into the flue gas duct 13 from the spray nozzle 15 using the spray nozzle 15. However, the present invention is not limited thereto. It is only necessary for the $NH_4Cl$ solution supply means 16 to be able to stably spray the $NH_4Cl$ solution 14 into the flue gas duct 13. FIG. 4 is a diagram showing an example of the configuration of the $NH_4Cl$ solution supply means. As shown in FIG. 4, in the $NH_4Cl$ solution supply means 16, the spray nozzle 15 has a double-pipe structure in which an inner pipe thereof is the $NH_4Cl$ solution supply pipe 25 and an outer pipe thereof is the air supply pipe 27, and the nozzle hole 15a is provided at the tip portion of the nozzle hole 15a. The spray nozzle 15 is configured so that the air supply pipe 27 surrounds the $NH_4Cl$ solution supply pipe 25 and the spray nozzle 15 is inserted into the flue gas duct 13. Accordingly, the air 26 flows between the $NH_4Cl$ solution supply pipe 25 and the air supply pipe 27. As a result, it is possible to prevent the heat of the flue gas 12 in the flue gas duct 13 from transferring to the $NH_4Cl$ solution 14 by the air 26. Thus, the $NH_4Cl$ solution 14 can be prevented from being heated by the heat of the flue gas 12, thereby being able to maintain a liquid state thereof up to a point immediately before the $NH_4Cl$ solution 14 is jetted.

Moreover, the $NH_4Cl$ solution supply means 16 includes, within the flue gas duct 13, a blowing pipe 32 inserted into the flue gas duct 13 so as to surround the spray nozzle 15, and an air supply pipe 34 for supplying air 33 into the blowing pipe 32. Moreover, the nozzle hole 15a of the spray nozzle 15 is provided at a jet hole 35 on a side wall surface at a tip portion of the blowing pipe 32.

The air 33 is used for further dispersing droplets of the $NH_4Cl$ solution 14 within the flue gas duct 13. The air 33 is fed from an air supply unit 36 to the blowing pipe 32 via the air supply pipe 34, and jetted from a gap 37 between the jet hole 35 of the blowing pipe 32 and the nozzle hole 15a of the spray nozzle 15. By jetting the air 33 from the gap 37, droplets of the $NH_4Cl$ solution 14 sprayed from the spray nozzle 15 can be dispersed within the flue gas duct 13. Moreover, as shown in FIG. 1, the flow rate of the air 33 supplied from the air supply unit 36 is adjusted by a valve V3.

The air 33 is used for preventing $NH_4Cl$ of the $NH_4Cl$ solution 14 sprayed from the spray nozzle 15 from being adhered to the blowing pipe 32 and for suppressing a temperature increase in the spray nozzle 15 so as to prevent the boil of the $NH_4Cl$ solution 14 and the precipitation of ammonium chloride particles. As shown in FIG. 4, since the blowing pipe 32 is inserted into the flue gas duct 13 so as to surround the spray nozzle 15 and the air 33 flows between the blowing pipe 32 and the $NH_4Cl$ solution supply pipe 25 of the spray nozzle 15, the air 33 serves as air for cooling the $NH_4Cl$ solution 14. Therefore, it is possible to prevent the heat of the flue gas 12 in the flue gas duct 13 from transferring to the inside of the $NH_4Cl$ solution supply pipe 25 of the spray nozzle 15 from the outside of the blowing pipe 32. Thus, a temperature increase inside the spray nozzle 15 can be prevented and the heating of the $NH_4Cl$ solution 14 can be prevented, whereby the $NH_4Cl$ solution 14 can be prevented from boiling within the spray nozzle 15. Thus, the $NH_4Cl$ solution 14 can maintain a liquid state thereof up to a point immediately before being jetted. Moreover, corrosion of the spray nozzle 15 can also be prevented.

Metal materials can be used as materials for forming the $NH_4Cl$ solution supply pipe 25 and the air supply pipe 27 since they can prevent a temperature increase inside the spray nozzle 15. For example, as materials for forming the $NH_4Cl$ solution supply pipe 25 and the air supply pipe 27, examples for the $NH_4Cl$ solution supply pipe 25 include a corrosion-resistant metal, for example, a nickel-based heat-resistant and corrosion-resistant alloy such as hastelloy C, and a resin lining steel pipe (low temperature part). Examples for the air supply pipe 27 include carbon steel, stainless steel, and the like.

Moreover, although the spray nozzle 15 employs a two-fluid nozzle for spraying the $NH_4Cl$ solution 14, the present invention is not limited thereto. A single-fluid nozzle typically used for spraying a liquid may be used.

Moreover, since the spray nozzle 15 has a double-pipe structure with the $NH_4Cl$ solution supply pipe 25 and the air supply pipe 27 so that the periphery of the $NH_4Cl$ solution supply pipe 25 is surrounded by the air supply pipe 27, it is possible to prevent the $NH_4Cl$ solution 14 from being heated by the heat of the flue gas 12. However, since the blowing pipe 32 is provided around the spray nozzle 15, it becomes possible to prevent the $NH_4Cl$ solution 14 from being heated by the heat of the flue gas 12 in a more stable manner.

Although the $NH_4Cl$ solution supply pipe 25 is provided inside the air supply pipe 27, the $NH_4Cl$ solution supply pipe 25 may be provided not inside the air supply pipe 27 but outside the air supply pipe 27.

Moreover, the air 26 is supplied from the air supply unit 31 and the air 33 is supplied from the air supply unit 36, i.e., air is supplied respectively from different supply sources. However, the present invention is not limited thereto, and air may be supplied from the same supply source. That is, the air 33 may be air supplied from the air supply unit 31. Moreover, the air 26 may be air supplied from the air supply unit 36.

Moreover, the droplets of the NH$_4$Cl solution 14, which are sprayed into the flue gas duct 13 from the spray nozzle 15, evaporate by a high ambient temperature of the flue gas 12, thereby producing fine solid particles of NH$_4$Cl. The fine solid particles of NH$_4$Cl are broken down into HCl and NH$_3$ as in the following expression (1) and sublimed. Thus, the NH$_4$Cl solution 14 is sprayed from the spray nozzle 15, whereby HCl and NH$_3$ can be produced from the droplets of the sprayed NH$_4$Cl solution 14. Then, the NH$_3$ gas and the HCl gas can be therefore supplied into the flue gas duct 13.

$$NH_4Cl \rightarrow NH_3 + HCl \qquad (1)$$

Moreover, the temperature of the flue gas 12 in the flue gas duct 13 is high, for example, 320° C. or higher and 420° C. or lower. The NH$_4$Cl solution supply pipe 25 of the spray nozzle 15 is provided inside the blowing pipe 32, and the air 33 is used for cooling the NH$_4$Cl solution 14. Thus, by maintaining the liquid state of the NH$_4$Cl solution 14 up to a point immediately before it is jetted from the spray nozzle 15 and spraying the NH$_4$Cl solution 14 in a droplet form from the spray nozzle 15, the sprayed droplets of the NH$_4$Cl solution 14 can be gasified by the high ambient temperature of the flue gas 12.

Moreover, droplets of the NH$_4$Cl solution 14 sprayed from the spray nozzle 15 are preferably fine droplets having a diameter in a range of 1 nm or larger and 100 μm or smaller on average. Since fine droplets in a range of 1 nm or larger and 100 μm or smaller on average can be generated, the solid particles of NH$_4$Cl produced from the droplets of the sprayed NH$_4$Cl solution 14 can be broken down into NH$_3$ and HCl with a short residence time in the flue gas 12 and can be sublimed. Thus, there is no need to heat the NH$_4$Cl solution 14 in advance, thereby being able to prevent the degradation and corrosion of the flue gas duct 13 and the spray nozzle 15.

The NH$_4$Cl solution 14 can be produced by dissolving ammonium chloride (NH$_4$Cl) powders in water. Since the respective supply amounts of the NH$_4$Cl powders and the water can be adjusted, the NH$_4$Cl solution 14 can be adjusted to a predetermined concentration. The NH$_4$Cl solution 14 may be produced by mixing an HCl solution with an NH$_3$ solution at a predetermined concentration ratio.

Moreover, the concentration of the NH$_4$Cl solution 14 is preferably in a range of 20 wt % or higher and 30 wt % or lower when the temperature of a droplet thereof is 20° C., for example. Table 3 shows relationships among a temperature of a droplet of the NH$_4$Cl solution 14, solubility thereof, and a concentration thereof. This is because solubility of the NH$_4$Cl solution 14 is approximately determined by the temperature of a droplet thereof as shown in Table 3.

TABLE 3

| TEMPERATURE (° C.) | SOLUBILITY (g/100 g WATER) | CONCENTRATION (wt %) |
|---|---|---|
| 0 | 29.4 | 22.7 |
| 20 | 37.2 | 27.1 |
| 40 | 45.8 | 31.4 |
| 60 | 55.2 | 35.6 |
| 80 | 65.6 | 39.6 |
| 100 | 77.3 | 43.6 |

Although depending on the combustion conditions of the boiler 11, the temperature of the flue gas 12 in the flue gas duct 13 is preferably in a range of 320° C. or higher and 420° C. or lower, more preferably in a range of 320° C. or higher and 380° C. or lower, and further preferably in a range of 350° C. or higher and 380° C. or lower, for example. This is because these temperature ranges make it possible to efficiently generate an NOx removal reaction and an Hg oxidation reaction simultaneously on the denitration catalyst.

Thus, the NH$_4$Cl solution 14 can be sprayed in a liquid state from the spray nozzle 15, whereby the NH$_4$Cl solution 14 can be broken down into the HCl gas and the NH$_3$ gas by the high ambient temperature of the flue gas 12, and these gases can be supplied into the flue gas duct 13. As a result, the concentration distributions of the HCl gas and the NH$_3$ gas can be made uniform in the flue gas 12. Moreover, since the NH$_4$Cl solution 14 can be prevented from being adhered to the wall surface of the flue gas duct 13 before the gasification thereof, it is possible to prevent a breakage of the flue gas duct 13 caused by corrosion of the flue gas duct 13, or the like.

FIG. 5 is a diagram showing an example of insertion of the spray nozzles into the flue gas duct. In the air pollution control device 10 according to the present embodiment, the spray nozzle 15 is inserted into the flue gas duct 13 perpendicularly as shown in FIG. 5, and the NH$_4$Cl solution 14 is sprayed in the gas flow direction of the flue gas 12 from the nozzle hole 15a provided on the side wall surface at the tip portion of the spray nozzle 15. However, the present invention is not limited thereto. FIG. 6 is a diagram showing another example of insertion of the spray nozzles into the flue gas duct. As shown in FIG. 6, the spray nozzle 15 may be inserted into the flue gas duct 13 obliquely with a predetermined angle, the nozzle hole 15a may be provided at the tip portion of the spray nozzle 15, and the NH$_4$Cl solution 14 may be sprayed from the nozzle hole 15a provided at the tip portion of the spray nozzle 15.

The flue gas 12 is fed to the mixer 17 after containing therein the HCl gas and the NH$_3$ gas produced by the droplets of the NH$_4$Cl solution 14 sprayed from the NH$_4$Cl solution supply means 16. The flue gas 12 is stirred in the mixer 17, and mixing of the HCl gas and the NH$_3$ gas with the flue gas 12 can be thereby promoted. This can provide uniform concentration distributions of the HCl gas and the NH$_3$ gas in the flue gas 12.

The mixer 17 of the present embodiment is provided on the downstream side of the region where the NH$_4$Cl solution 14 sprayed from the spray nozzle 15 is gasified. Under typical plant operating conditions, it is preferable that the mixer 17 be provided at 1 m or more downstream side of the supply position at which the NH$_4$Cl solution 14 is supplied. This is because under realistic plant operating conditions, if the mixer 17 is at a position less than 1 m away from the supply position at which the NH$_4$Cl solution 14 is supplied, the droplets of the NH$_4$Cl solution 14 often contact with the mixer 17 before the vaporization thereof. Thus, the mixer 17 is provided at 1 m or more downstream side of the supply position at which the NH$_4$Cl solution 14 is supplied, whereby the mixing of the HCl gas and the NH$_3$ gas in the flue gas 12 can be further promoted. Moreover, in view of a realistic device layout, the mixer 17 is away from the supply position of the NH$_4$Cl solution 14 with a distance up to about 10 m.

Figure 7:
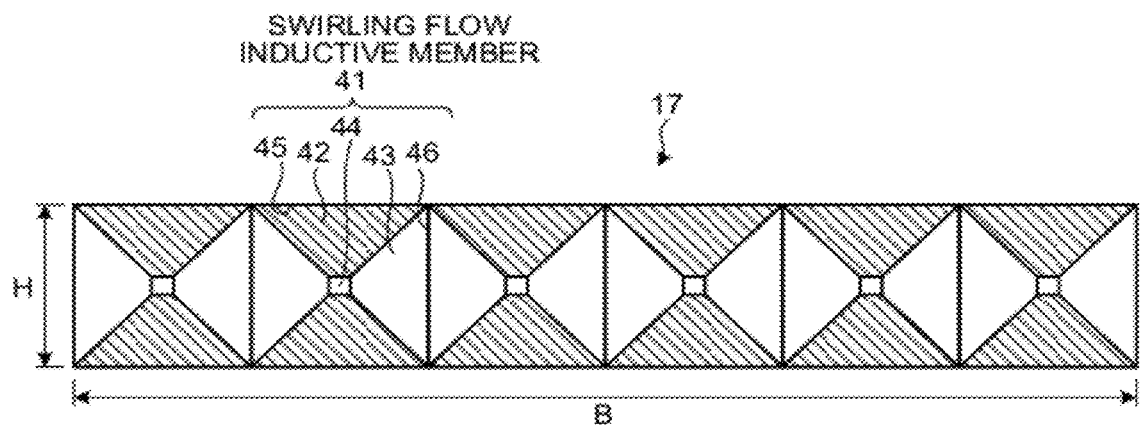
FIG. 7 is a plan view showing an example of a mixer.
Figure 8:
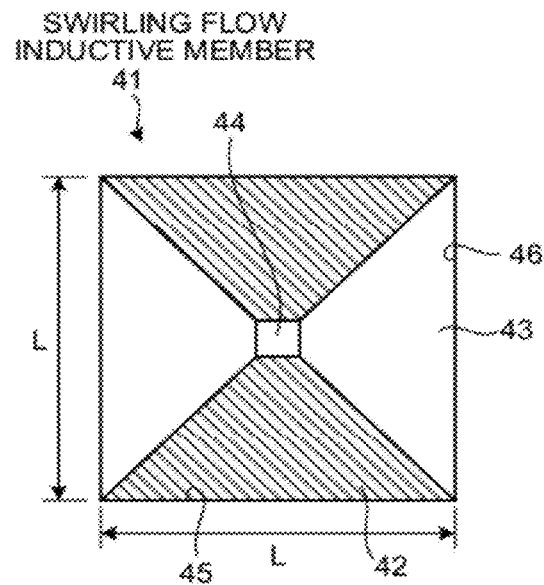
FIG. 8 is a plan view of a swirling flow inductive member forming the mixer.
Figure 9:
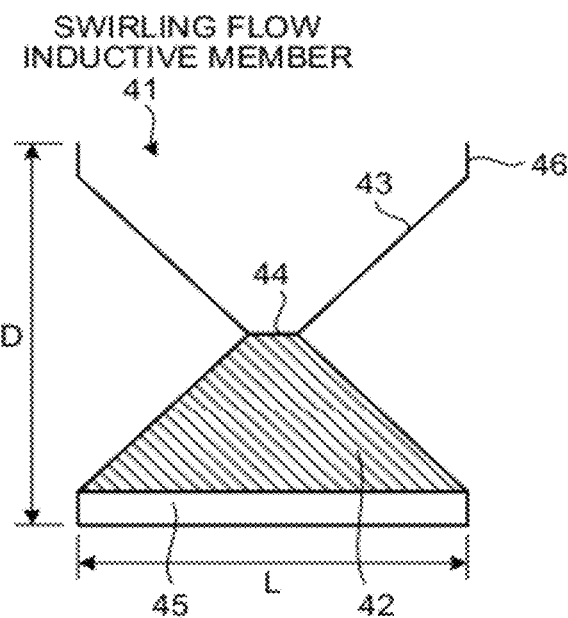
FIG. 9 is a front view of the swirling flow inductive member.
Figure 10:
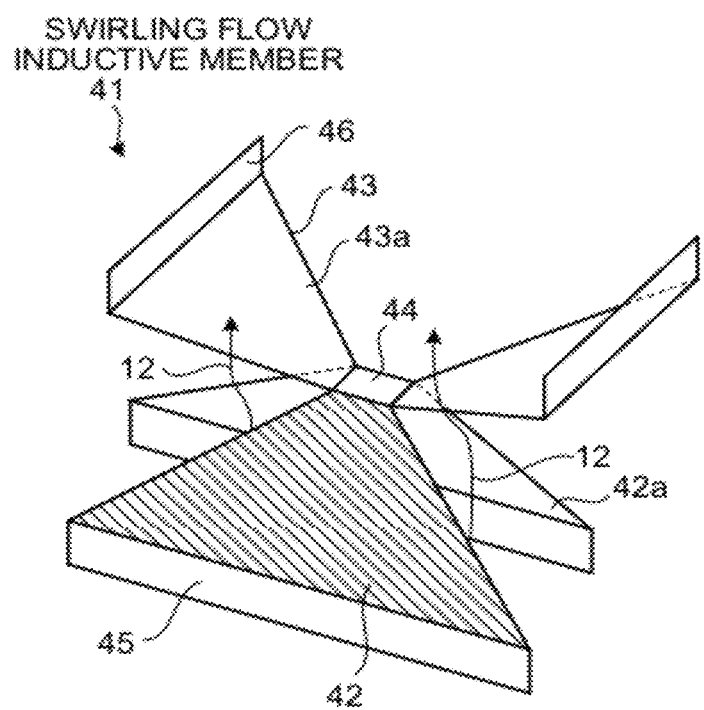
FIG. 10 is a perspective view of the swirling flow inductive member.

Moreover, a configuration of the mixer 17 is shown in FIGS. 7 to 10. FIG. 7 is a plan view showing an example of the mixer. FIG. 8 is a plan view of a swirling flow inductive member forming the mixer. FIG. 9 is a front view of the swirling flow inductive member, and FIG. 10 is a perspective view of the swirling flow inductive member. Note that in FIGS. 7 to 10, the part of reference numeral 42 is shown with hatching in order to clarify a difference with the member of reference numeral 46.

As shown in FIG. 7, the mixer 17 of the present embodiment is formed by a unit of six swirling flow inductive members 41 for generating a swirling flow in the flue gas 12, which are disposed so as to be perpendicular to the flow direction of the flue gas 12. As shown in FIGS. 8 to 10, the swirling flow inductive member 41 includes a pair of first swirling flow inductive plates 42 having opposed surfaces 42*a* on an inlet side of the flue gas 12, and a pair of second swirling flow inductive plates 43 having opposed surfaces 43*a* on a discharge side of the flue gas 12. At a flat plate-shaped intermediate member 44 as a connecting portion for connecting the first swirling flow inductive plates 42 and the second swirling flow inductive plates 43, the first swirling flow inductive plate 42 and the second swirling flow inductive plate 43 are connected thereto in such a way that the opposed surfaces 42*a* of the first swirling flow inductive plate 42 and the opposed surfaces 43*a* of the second swirling flow inductive plate 43 are directed differently. In the present embodiment, the opposed surfaces 42*a* of the first swirling flow inductive plate 42 and the opposed surfaces 43*a* of the second swirling flow inductive plate 43 are disposed so as to be different from each other by about 90°.

The first swirling flow inductive plate 42 and the second swirling flow inductive plate 43 are each formed in an approximately triangular shape. Moreover, since the first swirling flow inductive plates 42 are provided on the inlet side of the flue gas 12 and the second swirling flow inductive plates 43 are provided on the discharge side of the flue gas 12, the first swirling flow inductive plates 42 are positioned below the second swirling flow inductive plates 43 when the swirling flow inductive member 41 is viewed from the front thereof. Moreover, the intermediate member 44 is a flat plate and functions as a pivot for connecting the first swirling flow inductive plates 42 and the second swirling flow inductive plates 43. Moreover, the first swirling flow inductive plate 42 is provided with a lower support plate 45, and the second swirling flow inductive plate 43 is provided with an upper support plate 46. The swirling flow inductive members 41 adjacent to each other are connected with each other by the lower support plates 45 and the upper support plates 46 thereof.

As shown in FIG. 10, when the flue gas 12 flows into the swirling flow inductive member 41, the flue gas 12 collides against the reverse sides of the opposed surfaces 42*a* of the first swirling flow inductive plates 42. As a result, the gas flow thereof is changed, and the flue gas 12 thereby flows in a direction of the second swirling flow inductive plates 43. Thereafter, the flue gas 12 collides against the reverse sides of the opposed surfaces 43*a* of the second swirling flow inductive plates 43, thereby further changing the gas flow thereof. Thus, the flue gas 12 changes the gas flow thereof by the first swirling flow inductive plates 42 and the second swirling flow inductive plates 43, thereby flowing in such a way as to detour the first swirling flow inductive plates 42 and the second swirling flow inductive plates 43 and flowing while revolving from the inflow direction of the flue gas 12 in the swirling flow inductive member 41 toward the discharging direction of the flue gas 12.

Moreover, although the opposed surfaces 42*a* of the first swirling flow inductive plate 42 and the opposed surfaces 43*a* of the second swirling flow inductive plate 43 are disposed so as to be directed differently by about 90° in the present embodiment, the present invention is not limited thereto. The angle between the direction of the opposed surface 42*a* of the first swirling flow inductive plate 42 and the direction of the opposed surface 43*a* of the second swirling flow inductive plate 43 may be any angle as long as they can flow the flue gas 12 flowed into the swirling flow inductive member 41 while making it revolve from the inflow direction of the flue gas 12 in the swirling flow inductive member 41 toward the discharging direction of the flue gas 12.

Moreover, although the mixer 17 is formed as a unit in which six swirling flow inductive members 41 are disposed perpendicularly to the flow direction of the flue gas 12 as shown in FIG. 7 in the present embodiment, the present invention is not limited thereto. The number of swirling flow inductive members 41 to be disposed is appropriately changed depending on the area of the flue gas duct 13, and the like.

Moreover, although the mixer 17 is formed as a single unit in which six swirling flow inductive members 41 are disposed in the flow direction of the flue gas 12 in the present embodiment, the present invention is not limited thereto. A plurality of units each having a plurality of swirling flow inductive members 41 disposed in the flow direction of the flue gas 12 may be provided in multiple stages. Moreover, the mixer 17 of the present embodiment may be provided with a unit in which a plurality of swirling flow inductive members 41 are disposed in a direction perpendicular to the flow direction of the flue gas 12, and also a plurality of units each having a plurality of swirling flow inductive members 41 disposed in the flow direction of the flue gas 12 may be provided.

Figure 11:
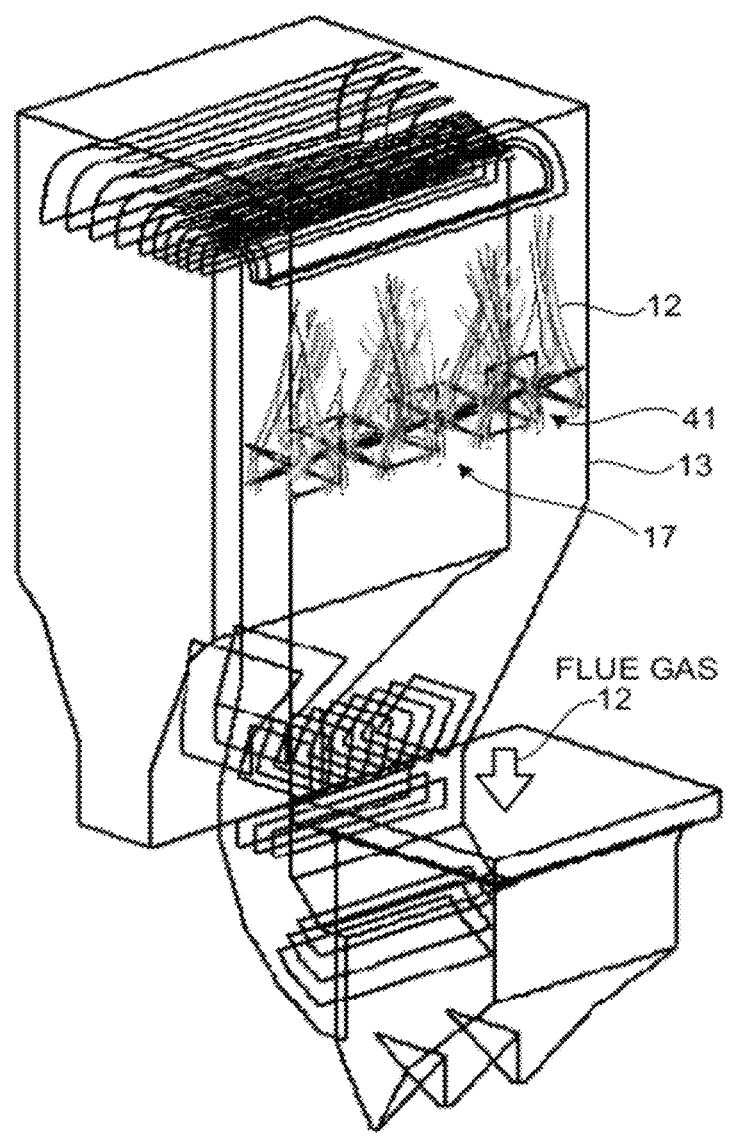
FIG. 11 is a diagram schematically showing a gas flow of a flue gas when the mixer is installed within the flue gas duct.
Figure 12:
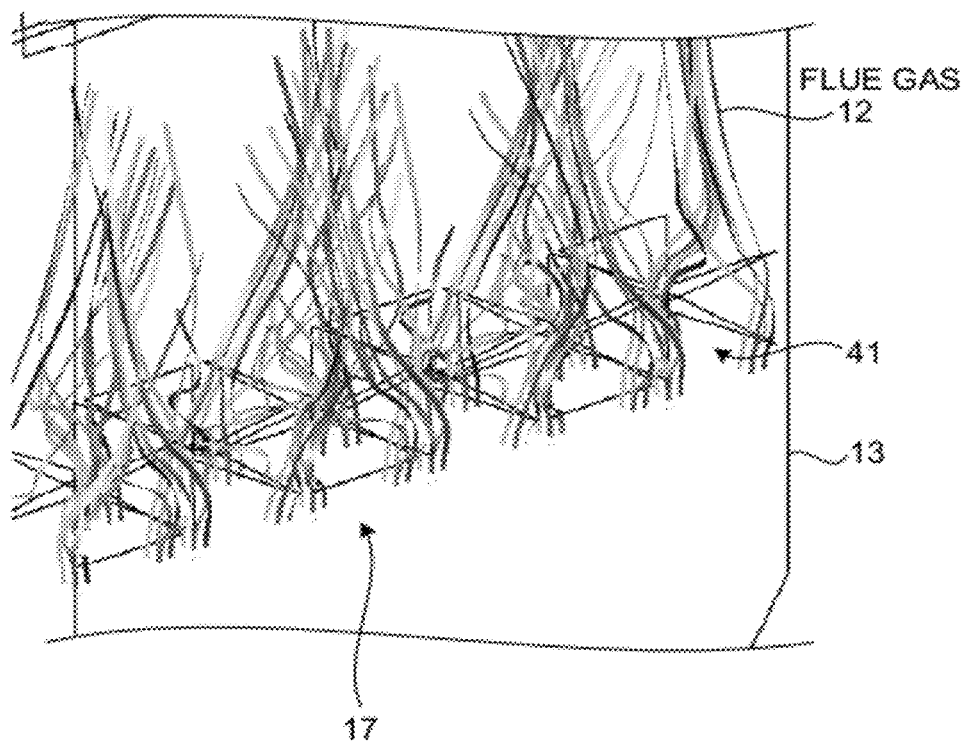
FIG. 12 is a partial enlarged view of FIG. 11.

FIG. 11 is a diagram schematically showing a gas flow of the flue gas when the mixer is installed within the flue gas duct, and FIG. 12 is a partial enlarged view of FIG. 11. Note that in FIGS. 11 and 12, six swirling flow inductive members 41 are provided in a width direction of the flue gas duct 13 as in FIG. 7.

As shown in FIGS. 11 and 12, when the flue gas 12 passes through the swirling flow inductive member 41, the flue gas 12 collides against the first swirling flow inductive plates 42 and the second swirling flow inductive plates 43. As a result, the gas flow thereof is changed, and the flue gas 12 thereby flows in such a way as to detour the first swirling flow inductive plates 42 and the second swirling flow inductive plates 43. Therefore, the flue gas 12 can flow, while revolving, from the lower side of the flue gas duct 13 toward the upper side thereof. As a result, it is possible to promote the mixing of the HCl gas and the NH$_3$ gas with the flue gas 12.

Moreover, since the mixer 17 is provided on the downstream side of the region where the NH$_4$Cl solution 14 sprayed from the spray nozzle 15 is gasified, it is possible to prevent droplets of the NH$_4$Cl solution 14 from contacting with the mixer 17 before the gasification thereof. Thus, it is possible to prevent a breakage of the mixer 17 due to heat shock, corrosion of the mixer 17, deposition of ash in the flue gas 12, and the like from occurring.

Figure 13:
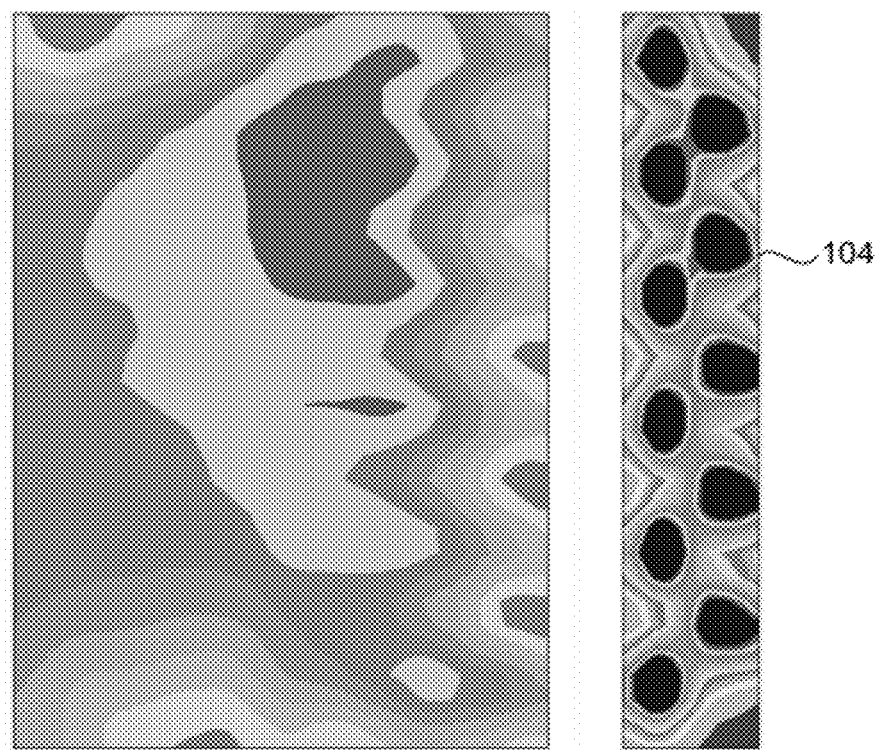
FIG. 13 is a diagram schematically showing an example of the $NH_3$ gas concentration distribution in the flue gas when the mixer is not installed within the flue gas duct.
Figure 14:
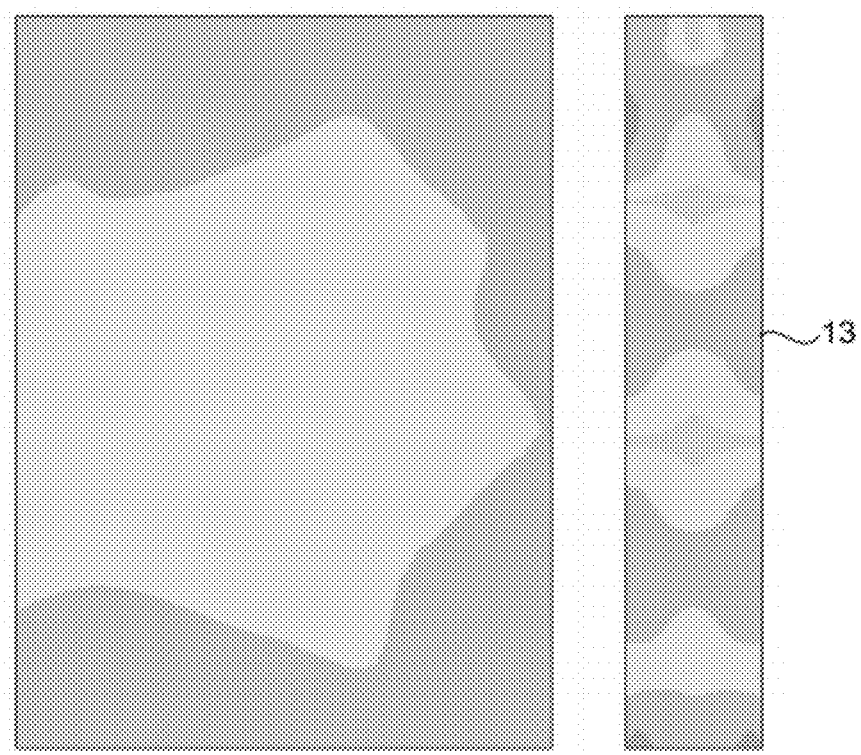
FIG. 14 is a diagram schematically showing an example of the $NH_3$ gas concentration distribution in the flue gas when the mixer is installed within the flue gas duct.
Figure 34:
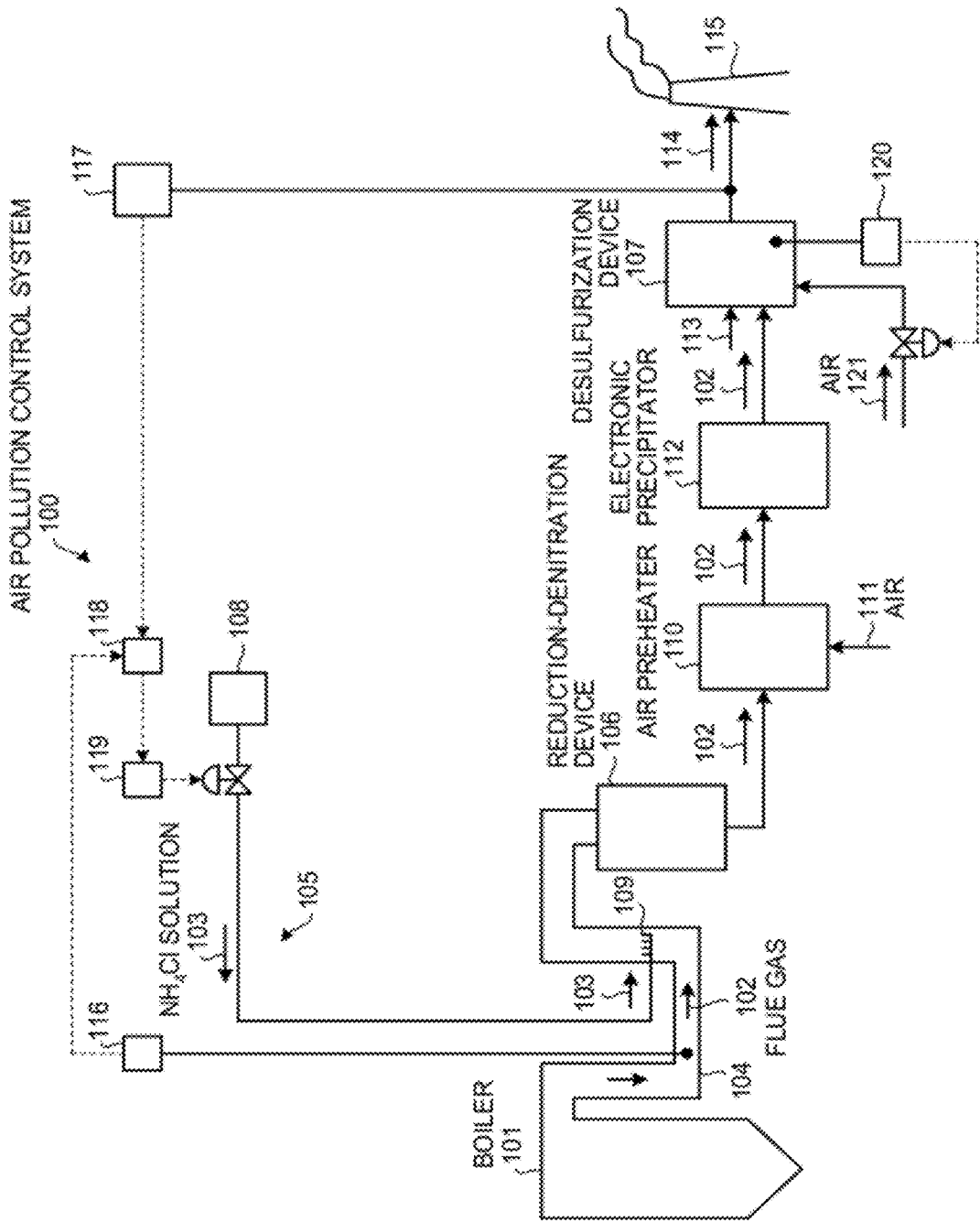
FIG. 34 is a diagram showing a schematic diagram of an air pollution control system for the flue gas discharged from a boiler.
Figure 35:
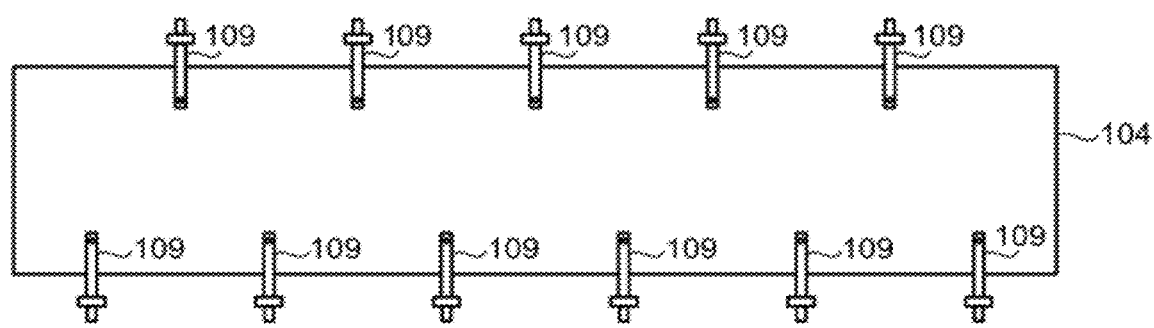
FIG. 35 is a diagram showing an arrangement of spray nozzles as viewed from a flow direction of the flue gas in a flue gas duct.

FIGS. 13 and 14 are cross-sectional views taken along the line A-A in FIG. 2. FIG. 13 is a diagram schematically showing an example of the NH$_3$ gas concentration distribution in the flue gas when the mixer is not installed within the flue gas duct. FIG. 14 is a diagram schematically showing an example of the NH$_3$ gas concentration distribution in the flue gas when the mixer is installed within the flue gas duct. Note that in FIG. 13, reference numeral 104 indicates a flue gas duct in the conventional air pollution control system shown in FIG. 34.

As shown in FIGS. 13 and 14, unevenness in the NH$_3$ gas concentration distribution in the flue gas 12 immediately before flowing into the reduction-denitration device 18 in a case where the mixer 17 is not installed is greater than that in a case where the mixer 17 is installed within the flue gas duct 13.

Thus, since the mixing of the NH$_3$ gas with the flue gas 12 in the flue gas duct 13 can be promoted by providing the mixer 17 on the downstream side of the region where the NH$_4$Cl solution 14 sprayed from the spray nozzle 15 is gasified, unevenness in the NH$_3$ gas concentration distribution in the flue gas 12 can be suppressed. Unevenness in the NH$_3$ gas concentration distribution is kept within about 5%, for example, thereby making the distribution substantially uniform. Thus, it is possible to improve an NOx reduction efficiency with the denitration catalyst in the reduction-denitration device 18.

Moreover, since the mixer 17 is provided on the downstream side of the region where the NH$_4$Cl solution 14 sprayed from the spray nozzle 15 is gasified, the mixing of the HCl gas, in addition to the NH$_3$ gas, with the flue gas 12 in the flue gas duct 13 can also be promoted. Thus, unevenness in the HCl gas concentration distribution in the flue gas 12 can be suppressed. Unevenness in the HCl gas concentration distribution is also kept within about 5%, for example, thereby making the distribution substantially uniform. Thus, it is possible to improve an Hg oxidation ability with the denitration catalyst in the reduction-denitration device 18.

Moreover, as shown in FIGS. 7 to 10, the width L and the height D of the swirling flow inductive member 41 are preferably within the ranges of the following expressions (2) and (3).

$$\mathrm{MIN}(B,H)/10 \leq L \leq \mathrm{MIN}(B,H) \qquad (2)$$

$$\mathrm{MIN}(B,H)/10 \leq D \leq 5 \times \mathrm{MIN}(B,H) \qquad (3)$$

Note however that B represents a long side of the cross-section of the flue gas duct at the installation position, H represents a short side of the cross-section of the flue gas duct, and MIN(B,H) represents the shorter one of the long side B of the cross-section of the flue gas duct and the short side H of the cross-section of the flue gas duct. When the long side B and the short side H of the cross-section of the flue gas duct have the same length, either one may be used.

The reason why the swirling flow inductive member 41 is made to fall within the ranges of the expressions (2) and (3) above is that determination is required in view of the conditions for pressure loss of the mixer 17, unevenness in the NH$_3$ concentration in the flue gas 12, the workability when manufacturing, the realistic operating conditions, the maintenance ability, etc.

Figure 15:
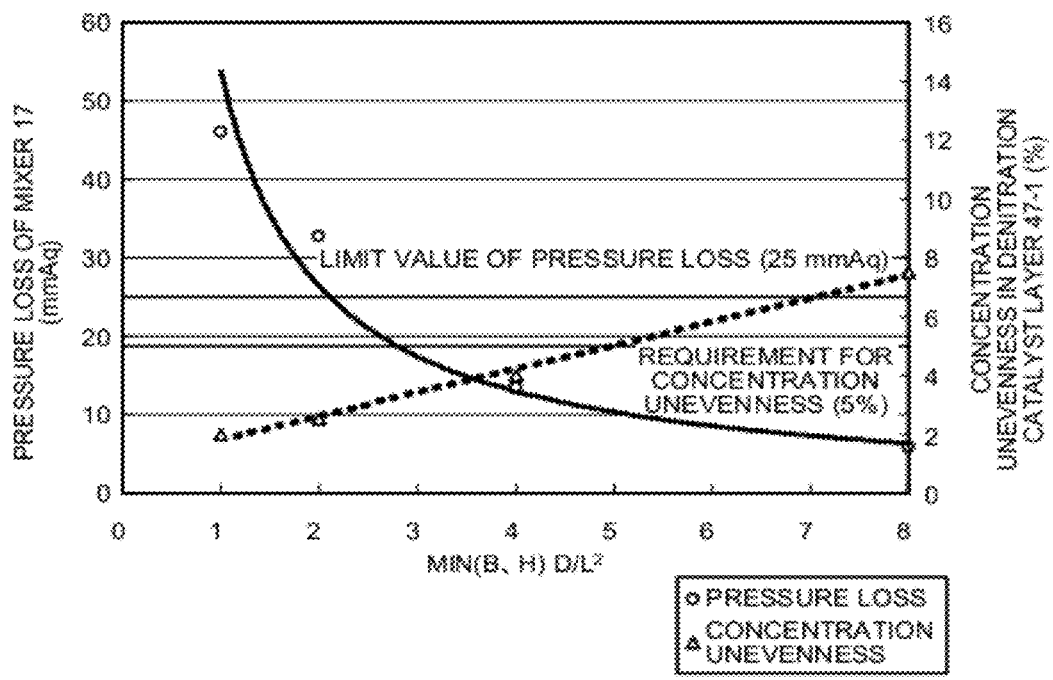
FIG. 15 is a diagram showing the relationship between a pressure loss of the mixer and a dimension of the mixer.

FIG. 15 is a diagram showing the relationship between the pressure loss of the mixer 17 and the dimension of the mixer. As shown in FIG. 15, in order for the pressure loss of the mixer 17 to be 25 mmAq or lower, the following expression (4) needs to be satisfied. Moreover, in order for the concentration unevenness in the NH$_3$ concentration in the flue gas 12 to be kept within 5%, the following expression (5) needs to be satisfied.

$$\mathrm{MIN}(B,H) \times D/L^2 \leq 2 \qquad (4)$$

$$\mathrm{MIN}(B,H) \times D/L^2 \leq 5 \qquad (5)$$

That is, as pressure loss conditions, in order for the pressure loss of the mixer 17 to be 25 mmAq or lower, the expression (4) above needs to be satisfied. Moreover, in order for the concentration unevenness in the NH$_3$ concentration in the flue gas 12 to be kept at 5% or lower as an advantageous effect of the mixer 17, the expression (5) above needs to be satisfied.

Moreover, the mixer 17 needs to satisfy the above expression (2) and the following expression (6) in view of the workability when manufacturing, the realistic operating conditions, and the maintenance ability.

$$\mathrm{MIN}(B,H)/10 \leq L \leq \mathrm{MIN}(B,H) \qquad (2)$$

$$\mathrm{MIN}(B,H)/10 \leq D \qquad (6)$$

From the above expressions (4) and (5), D can be expressed as in the following expression (7).

$$2L^2/\mathrm{MIN}(B,H) \leq D \leq 5L^2/\mathrm{MIN}(B,H) \qquad (7)$$

By substituting the above expression (2) into the above expression (7), D can be expressed as in the following expression (8).

$$\mathrm{MIN}(B,H)/50 \leq D \leq 5 \times \mathrm{MIN}(B,H) \qquad (8)$$

If the above expression (6) is taken into consideration in the above expression (8), D can be expressed as in the above expression (3).

$$\mathrm{MIN}(B,H)/10 \leq D \leq 5 \times \mathrm{MIN}(B,H) \qquad (3)$$

When the width L and the height D of the swirling flow inductive member 41 are within the ranges of the above expressions (2) and (3) as described above, a plurality of swirling flow inductive members 41 can be installed within the flue gas duct 13. Thus, it is possible to promote the mixing of HCl and NH$_3$ with the flue gas 12.

Moreover, the shapes of the first swirling flow inductive plate 42 and the second swirling flow inductive plate 43 are not limited to the triangular shapes formed so as to extend from the lower support plate 45 and the upper support plate 46 to the intermediate member 44, respectively. Any shape may be used as long as it can generate a swirling flow in the flue gas 12, thereby promoting the mixing of the HCl gas and the NH$_3$ gas with the flue gas 12. For example, the shapes of the first swirling flow inductive plate 42 and the second swirling flow inductive plate 43 may be of a curved line type, a corrugated type, or the like, extending from one ends of the second swirling flow inductive plate 43 and the first swirling flow inductive plate 42 toward the other ends thereof.

Thus, according to the air pollution control device 10 of the present embodiment, a plurality of swirling flow inductive members 41 are provided in a cross-sectional direction of the flue gas duct 13 as the mixer 17, and accordingly, the mixing of the HCl gas and the NH$_3$ gas with the flue gas 12 can be promoted. Thus, it is possible to achieve homogenization of the concentration distributions of NH$_3$ and HCl generated by the gasification of the NH$_4$Cl solution 14 sprayed from the spray nozzle 15. As a result, it is possible to improve an Hg oxidation ability and an NOx reducing ability by the denitration catalyst in the reduction-denitration device 18, and it is also possible to prevent a breakage of the flue gas duct 13 or a structure inside the flue gas duct such as the mixer 17 due to heat shock, corrosion of the flue gas duct 13, deposition of ash in the flue gas 12, and the like from occurring.

Moreover, as shown in FIG. 1, the HCl gas and the NH$_3$ gas generated from the droplets of the NH$_4$Cl solution 14 are fed to the reduction-denitration device 18 together with the flue gas 12. As shown in FIG. 2, the reduction-denitration device 18 is composed of three denitration catalyst layers 47-1 to 47-3. Moreover, the gas flow of the flue gas 12 is equalized by a current plate 48 before the flue gas 12 passes through the reduction-denitration device 18. The NH$_3$ gas generated by the decomposition of NH$_4$Cl is used in the reduction-denitration device 18 for the NOx reduction and denitration, and the HCl gas is used for the Hg oxidation. Thus, the amounts of NOx and Hg are reduced in the flue gas 12.

That is, the NH$_3$ gas performs the reduction and denitration of NOx as in the following expression (9) on the denitration catalysts of the denitration catalyst layers 47-1 to 47-3 filled in the reduction-denitration device 18. The HCl gas performs the mercury oxidation of Hg as in the following expression (10).

$$4NO + 4NH_3 + O_2 \rightarrow 4N_2 + 6H_2O \quad (9)$$

$$Hg + 1/2O_2 + 2HCl \rightarrow HgCl_2 + H_2O \quad (10)$$

Moreover, although the reduction-denitration device 18 is composed of the three denitration catalyst layers 47-1 to 47-3, the present invention is not limited thereto. The reduction-denitration device 18 can suitably change the number of denitration catalyst layers depending on the denitration ability thereof.

Moreover, as shown in FIG. 1, after NOx and Hg in the flue gas 12 are respectively subjected to reduction and oxidation in the reduction-denitration device 18, the flue gas 12 is passed through the air heater 19 and the precipitator 20, and fed to the wet desulfurization device 22. Moreover, a heat recovery unit may be provided between the air heater 19 and the precipitator 20.

In the wet desulfurization device 22, the flue gas 12 is fed from a wall surface side at a bottom portion in a device body 49, and the limestone-gypsum slurry 21 used as an alkali absorbent is supplied into the device body 49 by an absorbent feed line 50 so as to be jetted toward a top portion side from a nozzle 51. The flue gas 12 rising from the bottom portion side in the device body 49 and the falling limestone-gypsum slurry 21 after being jetted from the nozzle 51 are made opposed to each other to achieve gas-liquid contact. HgCl and sulfur oxides (SOx) in the flue gas 12 are absorbed into the limestone-gypsum slurry 21, thereby being separated and reduced in amount in the flue gas 12. As a result, the flue gas 12 is purged. The flue gas 12 purged by the limestone-gypsum slurry 21 is discharged as purged gas 52 from the top portion side and then discharged to the outside of the system from a stack 53.

The limestone-gypsum slurry 21 used for the desulfurization of the flue gas 12 is produced by mixing a limestone slurry $CaCO_3$ obtained by dissolving limestone powders into water, a gypsum slurry $CaSO_4$ obtained by reacting limestone with SOx in the flue gas 12 and further oxidizing the resultant, and water. For example, the limestone-gypsum slurry 21 may be the one obtained by pumping up a liquid accumulated in a bottom portion 65 of the device body 49 in the wet desulfurization device 22. In the device body 49, SOx in the flue gas 12 reacts with the limestone-gypsum slurry 21 as in the following expression (11).

$$CaCO_3 + SO_2 + 0.5H_2O \rightarrow CaSO_3 \cdot 0.5H_2O + CO_2 \quad (11)$$

On the other hand, the limestone-gypsum slurry 21, which has absorbed SOx in the flue gas 12, is mixed with water 54 supplied into the device body 49, and is subjected to an oxidation treatment by air 55 supplied to the bottom portion 65 of the device body 49. Here, the limestone-gypsum slurry 21 flowed down in the device body 49 reacts with the water 54 and the air 55 as in the following expression (12).

$$CaSO_3 \cdot 0.5H_2O + 0.5O_2 + 1.5H_2O \rightarrow CaSO_4 \cdot 2H_2O \quad (12)$$

Moreover, the limestone-gypsum slurry 21, which is accumulated in the bottom portion 65 of the wet desulfurization device 22 and has been used for desulfurization, is extracted from the bottom portion 65 after the oxidation treatment thereof and fed to a dehydrator 56. Thereafter, it is discharged to the outside of the system as a dehydrated cake (gypsum) 57 containing mercury chloride (HgCl). As the dehydrator 56, a belt filter or the like may be used, for example. Moreover, filtrate which has been dehydrated (dehydrated filtrate) is subjected to an effluent treatment such as the removal of suspended solids and a heavy metal in the dehydrated filtrate, and pH adjustment of the dehydrated filtrate, for example. Part of the dehydrated filtrate which has been subjected to the effluent treatment is sent back to the wet desulfurization device 22, and another part of the dehydrated filtrate is treated as discharged water.

Moreover, although the limestone-gypsum slurry 21 is used as an alkali absorbent, another solution can be used as an alkali absorbent as long as it can absorb HgCl in the flue gas 12.

The limestone-gypsum slurry 21 is not limited to be supplied by a method in which the limestone-gypsum slurry 21 is jetted toward the top portion side from the nozzle 51, and it may be flowed down from the nozzle 51 so as to be opposed to the flue gas 12, for example.

<Control for Sprayed Amount of $NH_4Cl$ Solution>

A flowmeter 61 for measuring a flow rate of the flue gas 12 is provided on the upstream side of the spray nozzle 15. The flow rate of the flue gas 12 is measured by the flowmeter 61. The value of the flow rate of the flue gas 12 measured by the flowmeter 61 is sent to a control device 62. Based on the value of the flow rate of the flue gas 12, the flow rate, angle, initial velocity, and the like of the $NH_4Cl$ solution 14 sprayed from the spray nozzle 15 can be adjusted.

Moreover, an NOx concentration meter 63 is provided at an outlet side of the wet desulfurization device 22. The value of the NOx concentration in the purged gas 52 measured by the NOx concentration meter 63 is transmitted to the control device 62. The control device 62 can check the NOx reduction ratio in the reduction-denitration device 18 based on the value of the NOx concentration in the purged gas 52 measured by the NOx concentration meter 63. Thus, the $NH_4Cl$ concentration, the supply flow rate, and the like of the $NH_4Cl$ solution 14 are controlled based on the value of the NOx concentration in the purged gas 52 measured by the NOx concentration meter 63, whereby the $NH_4Cl$ concentration of the $NH_4Cl$ solution 14 sprayed from the spray nozzle 15 can be made to satisfy a predetermined denitration ability.

Moreover, mercury (Hg) concentration meters 64-1 and 64-2 for measuring an Hg content in the flue gas 12 discharged from the boiler 11 are provided in the flue gas duct 13. The Hg concentration meter 64-1 is provided in the flue gas duct 13 between the boiler 11 and the spray nozzle 15, and the Hg concentration meter 64-2 is provided between the reduction-denitration device 18 and the heat exchanger 19. The values of the Hg concentration in the flue gas 12 measured by the Hg concentration meters 64-1 and 64-2 are transmitted to the control device 62. The control device 62 can check Hg contents contained in the flue gas 12 based on the values of the Hg concentrations in the flue gas 12 measured by the Hg concentration meters 64-1 and 64-2. Since the $NH_4Cl$ concentration and the supply flow rate of the $NH_4Cl$ solution 14 are controlled based on the values of the Hg concentrations in the flue gas 12 measured by the Hg concentration meters 64-1 and 64-2, the $NH_4Cl$ concentration and the supply flow rate of the $NH_4Cl$ solution 14 sprayed from the spray nozzle 15 can be made to satisfy the predetermined denitration ability and to maintain the Hg oxidation ability.

Moreover, an oxidation-reduction potential measurement control device (ORP controller) 66 for measuring an oxidation-reduction potential of the limestone-gypsum slurry 21 is provided at the bottom portion 65 of the wet desulfurization device 22. The value of the oxidation-reduction potential of the limestone-gypsum slurry 21 is measured by the ORP controller 66. Based on the measured oxidation-reduction potential value, the supply amount of the air 55 supplied to the bottom portion 65 of the wet desulfurization device 22 is adjusted. The supply amount of the air 55 supplied to the bottom portion 65 is adjusted, so that it is possible to prevent the oxidized Hg trapped in the limestone-gypsum slurry 21 accumulated in the bottom portion 65 of the wet desulfurization device 22 from being reduced and also from being emitted from the stack 53.

The oxidation-reduction potential of the limestone-gypsum slurry 21 in the wet desulfurization device 22 is preferably in a range of 150 mV or higher and 600 mV or lower, for example, in order to prevent the re-scattering of Hg from the limestone-gypsum slurry 21. This is because if the oxidation-reduction potential is within the above-described range, Hg trapped in the limestone-gypsum slurry 21 as $HgCl_2$ is in a stable region, and it is therefore possible to prevent the re-scattering thereof into the air.

Moreover, although $NH_4Cl$ is used as a reduction-oxidation auxiliary agent in the air pollution control device 10 according to the present embodiment, ammonium halide other than $NH_4Cl$, such as ammonium bromide ($NH_4Br$) or ammonium iodide ($NH_4I$), may be used as a reduction-oxidation auxiliary agent and a solution obtained by dissolving such ammonium halide in water may be used.

As described above, according to the air pollution control device 10 of the present embodiment, it is possible to promote the mixing of HCl and $NH_3$, which are produced upon the gasification of $NH_4Cl$, with the flue gas 12 on the downstream side of the region where $NH_4Cl$ of the $NH_4Cl$ solution 14, which has been sprayed in the flue gas duct 13 on the upstream side of the reduction-denitration device 18, is gasified. Thus, HCl and $NH_3$ can be evenly supplied into the flue gas duct 13 with no concentration unevenness. As a result, in the reduction-denitration device 18, it is possible to maintain the Hg removal ability and the NOx reducing ability. It is also possible to prevent a breakage of the flue gas duct 13 or a structure inside the flue gas duct such as the mixer 17 due to heat shock, corrosion of the flue gas duct 13 or the mixer 17, deposition of ash in the flue gas 12, and the like from occurring.

Second Embodiment

Figure 16:
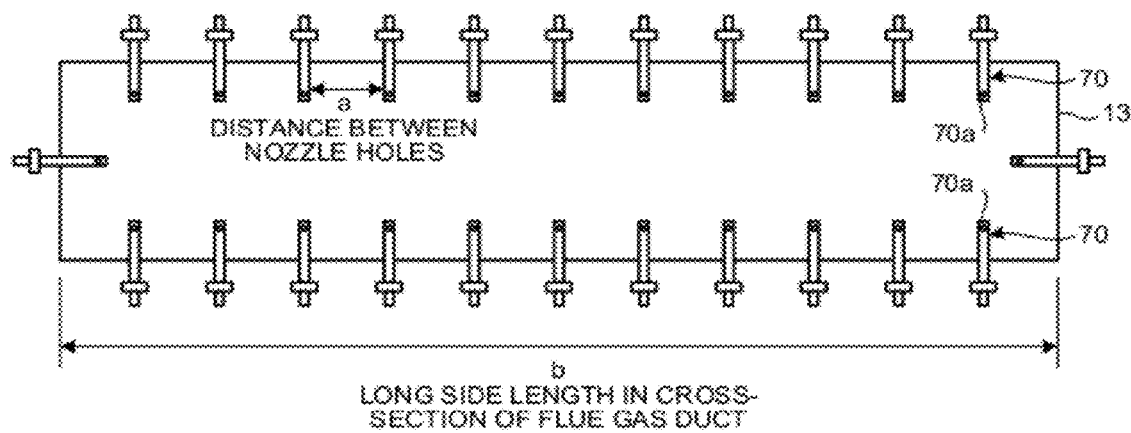
FIG. 16 is a diagram showing a cross-section of a flue gas duct of an air pollution control device according to a second embodiment of the present invention as viewed from a flow direction of the flue gas.

An air pollution control device according to a second embodiment of the present invention will be described with reference to the drawings. Since the air pollution control device according to the second embodiment of the present invention has a similar configuration to the air pollution control device 10 shown in FIG. 1 according to the first embodiment of the present invention, a description will be made in the present embodiment with reference to only a diagram showing a configuration of spray nozzles in a flue gas duct. FIG. 16 is a diagram showing a cross-section of the flue gas duct of the air pollution control device according to the second embodiment of the present invention as viewed from a flow direction of flue gas. Note that the elements overlapping with the configuration of the air pollution control device according to the first embodiment will be denoted by the same reference numerals and the description thereof will be omitted.

As shown in FIG. 16, the air pollution control device according to the present embodiment is formed by arranging a plurality of spray nozzles 70 in the flue gas duct 13 so as to satisfy the following expression (13).

$$a \le b/5 \tag{13}$$

Note however that a denotes a distance between nozzle holes of the spray nozzle, and b denotes a long side length of the lengths of the cross-section of the flue gas duct.

Since the plurality of spray nozzles 70 are disposed in the flue gas duct 13 so as to satisfy the above expression (13), the number of spray nozzles 70 to be disposed in the flue gas duct 13 can be increased as compared to the conventional technique, and the spray nozzles 15 can be appropriately disposed in the flue gas duct 13. Therefore, the amounts of $NH_3$ and HCl sprayed into the flue gas 12 can be further increased, thereby promoting the mixing of the $NH_3$ gas and the HCl gas into the flue gas 12.

Moreover, the plurality of spray nozzles 70 are preferably disposed in the flue gas duct 13 so as to satisfy the following expression (14).

$$a \le b/10 \tag{14}$$

Thus, according to the air pollution control device of the present embodiment, since the plurality of spray nozzles 70 are disposed in the flue gas duct 13 so as to satisfy the above expression (13), it is possible to promote the mixing of $NH_3$ with the flue gas 12. Thus, the HCl gas and the $NH_3$ gas can be evenly supplied into the flue gas duct 13 with no concentration unevenness, and it is possible to improve the Hg oxidation ability and the NOx reducing ability in the reduction-denitration device 18.

Third Embodiment

An air pollution control device according to the third embodiment of the present invention will be described with reference to the drawings.

Figure 17:
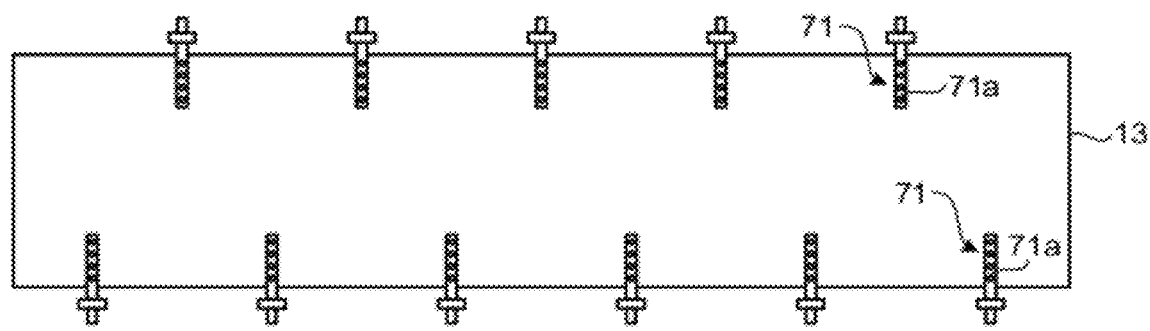
FIG. 17 is a diagram showing a cross-section of a flue gas duct of an air pollution control device according to a third embodiment of the present invention as viewed from a flow direction of the flue gas.
Figure 18:
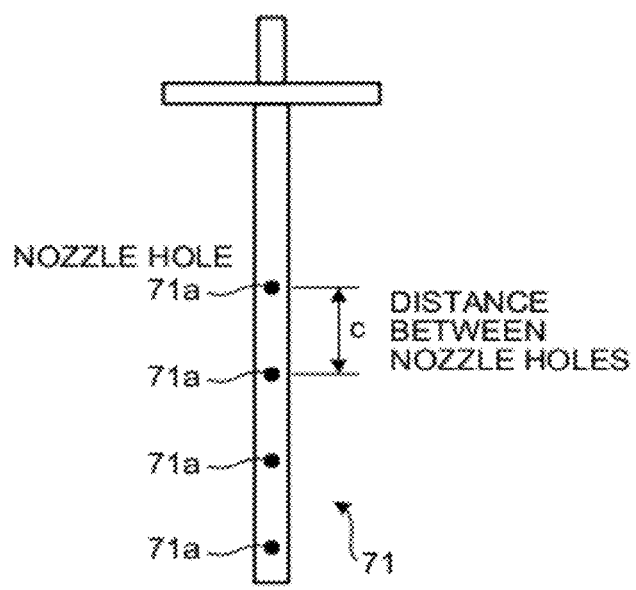
FIG. 18 is a diagram showing a configuration of a spray nozzle in a simplified manner.

Since the air pollution control device according to the third embodiment of the present invention has a similar configuration to the air pollution control device 10 shown in FIG. 1 according to the first embodiment of the present invention, a description will be made in the present embodiment with reference to only diagrams showing the configuration of spray nozzles in a flue gas duct. FIG. 17 is a diagram showing a cross-section of the flue gas duct of the air pollution control device according to the third embodiment of the present invention as viewed from a flow direction of flue gas. FIG. 18 is a diagram showing the configuration of the spray nozzle in a simplified manner. Note that the elements overlapping with the configurations of the air pollution control devices according to the first and second embodiments will be denoted by the same reference numerals and the description thereof will be omitted.

As shown in FIGS. 17 and 18, the air pollution control device according to the present embodiment includes spray nozzles 71 each having four nozzle holes 71a for spraying the $NH_4Cl$ solution 14. By increasing the number of the nozzle holes 71a of the spray nozzle 71, it is possible to increase an amount of the $NH_4Cl$ solution 14 sprayed into the flue gas duct 13 from one spray nozzle 71, thereby promoting the mixing of the HCl gas and the $NH_3$ gas with the flue gas 12.

As a result, it is possible to further improve the Hg oxidation ability and the NOx reducing ability in the reduction-denitration device 18.

Figure 19:
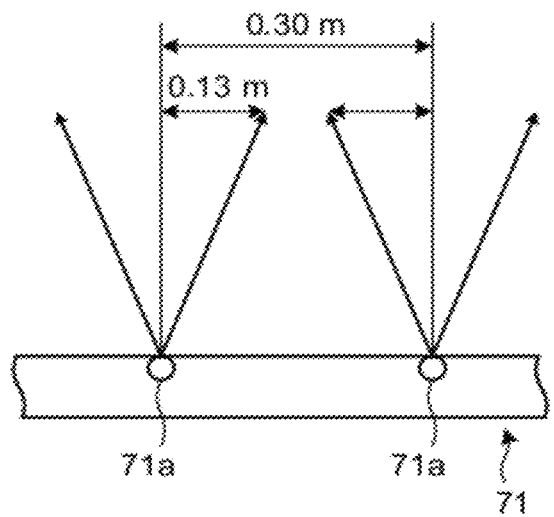
FIG. 19 is a partial enlarged view of the spray nozzle.

Moreover, a distance c between the nozzle holes 71a is preferably 0.3 m or shorter. Given that a droplet is about 40 μm, the moved distance of the droplet in the horizontal direction (i.e., the shortest distance x from the inner wall 13a of the flue gas duct 13 to the nozzle hole 71a of the spray nozzle 71) is 0.13 m from Table 2. Since the droplet, after being evaporated and sublimed, flows in the gas flow direction, it is desirable for the homogenization of the concentration distribution that the droplets sprayed from the two nozzle holes 71*a* overlap with each other before the evaporation and sublimation thereof. A partial enlarged view of the spray nozzle 71 is shown in FIG. 19. As shown in FIG. 19, the sum of distances over which the droplets emitted from the two nozzle holes 71*a* move in the horizontal direction before the evaporation thereof is 0.26 m (=0.13×2). Thus, by setting the distance c between the nozzle holes 71*a* to 0.3 m or shorter, droplets jetted from the two nozzle holes 71*a* can be overlapped with each other. Moreover, it is often the case where a droplet diameter realistically used is in a range of 40 μm or larger and 80 μm or smaller in view of the controllability and device dimension thereof. When the droplet diameter is about 40 μm as the lower limit thereof, by setting the distance c between the nozzle holes 71*a* to 0.3 m or shorter, droplets sprayed from the two nozzle holes 71*a* can be overlapped with each other.

Moreover, although each spray nozzle 71 is provided with four nozzle holes 71*a* in the air pollution control device according to the present embodiment, the present invention is not limited thereto. Two, three, or five or more nozzle holes 71*a* may be provided.

Fourth Embodiment

Figure 20:
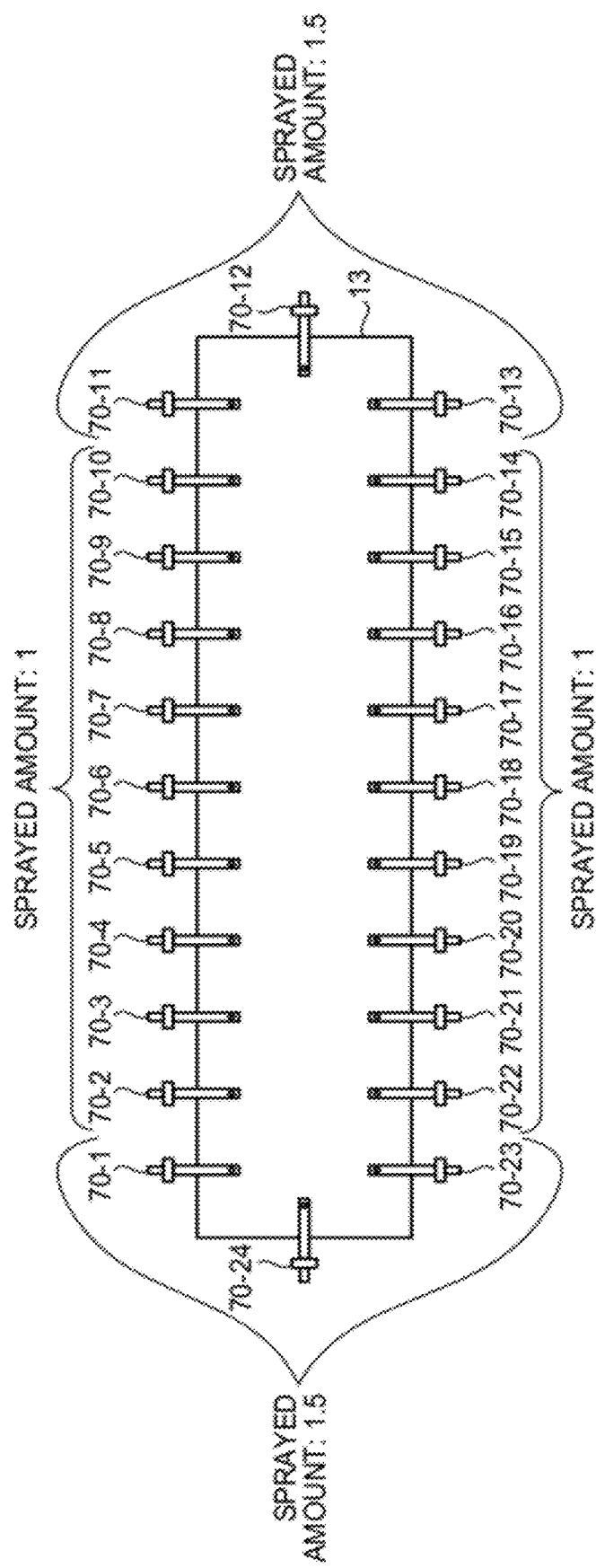
FIG. 20 is a diagram showing a cross-section of a flue gas duct of an air pollution control device according to a fourth embodiment of the present invention as viewed from a flow direction of the flue gas.

An air pollution control device according to the fourth embodiment of the present invention will be described with reference to the drawings. Since the air pollution control device according to the fourth embodiment of the present invention has a similar configuration to the air pollution control device 10 shown in FIG. 1 according to the first embodiment of the present invention, a description will be made in the present embodiment with reference to only a diagram showing the configuration of spray nozzles in a flue gas duct. The air pollution control device according to the fourth embodiment of the present invention can change a sprayed amount from each spray nozzle when twenty-four spray nozzles are provided in the flue gas duct 13. FIG. 20 is a diagram showing a cross-section of the flue gas duct of the air pollution control device according to the fourth embodiment of the present invention as viewed from a flow direction of flue gas. Note that the elements overlapping with the configurations of the air pollution control devices according to the first to third embodiments will be denoted by the same reference numerals and the description thereof will be omitted.

As shown in FIG. 20, in the air pollution control device according to the present embodiment, a sprayed amount of each of spray nozzles 70-1, 70-11 to 70-13, 70-23, and 70-24 provided on the short side of the flue gas duct 13 is made greater than a sprayed amount of each of spray nozzles 70-2 to 70-10 and 70-14 to 70-22 provided on the long side of the flue gas duct 13. For example, if the sprayed amount of each of the spray nozzles 70-2 to 70-10 and 70-14 to 70-22 is assumed to be 1, the sprayed amount of each of the spray nozzles 70-1, 70-11 to 70-13, 70-23, and 70-24 is set to 1.5.

Since the sprayed amount of the NH$_4$Cl solution 14 sprayed from each of the spray nozzles 70-1, 70-11 to 70-13, 70-23, and 70-24 provided on the short side of the flue gas duct 13 is made greater than the sprayed amount of the NH$_4$Cl solution 14 sprayed from each of the spray nozzles 70-2 to 70-10 and 70-14 to 70-22 provided on the long side of the flue gas duct 13, it is possible to efficiently spray the NH$_4$Cl solution 14 up to end portions of the flue gas duct 13. Thus, the HCl gas and the NH$_3$ gas can be supplied also to the flue gas 12 flowing near the end portions of the flue gas duct 13, thereby further improving the Hg oxidation ability and the NOx reducing ability in the reduction-denitration device 18.

Moreover, in the air pollution control device according to the present embodiment, when the sprayed amount of each of the spray nozzles 70-2 to 70-10 and 70-14 to 70-22 provided on the long side of the flue gas duct 13 is assumed to be 1, the sprayed amount of each of the spray nozzles 70-1, 70-11 to 70-13, 70-23, and 70-24 provided on the short side of the flue gas duct 13 is set to 1.5. However, the present invention is not limited thereto. A ratio between the spray nozzles provided on the short side of the flue gas duct 13 and the spray nozzles provided on the long side of the flue gas duct 13 is suitably adjusted depending on the NOx concentration and the Hg concentration in the flue gas 12, the sprayed amount of the NH$_4$Cl solution 14, and the like.

Although twenty-four spray nozzles 70-1 to 70-24 are provided within the flue gas duct 13 in the air pollution control device according to the present embodiment, the present invention is not limited thereto. A plurality of spray nozzles may be provided depending on an installation area in the flue gas duct 13, and the like.

Fifth Embodiment

Figure 21:
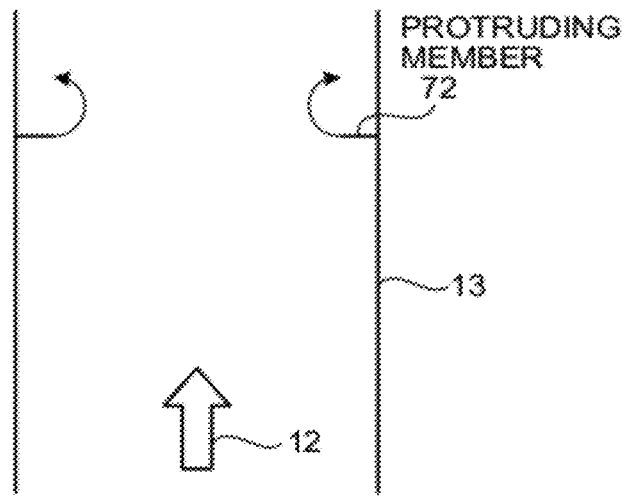
FIG. 21 is a diagram showing a flue gas duct of an air pollution control device according to a fifth embodiment of the present invention as viewed from a short side direction thereof.
Figure 22:
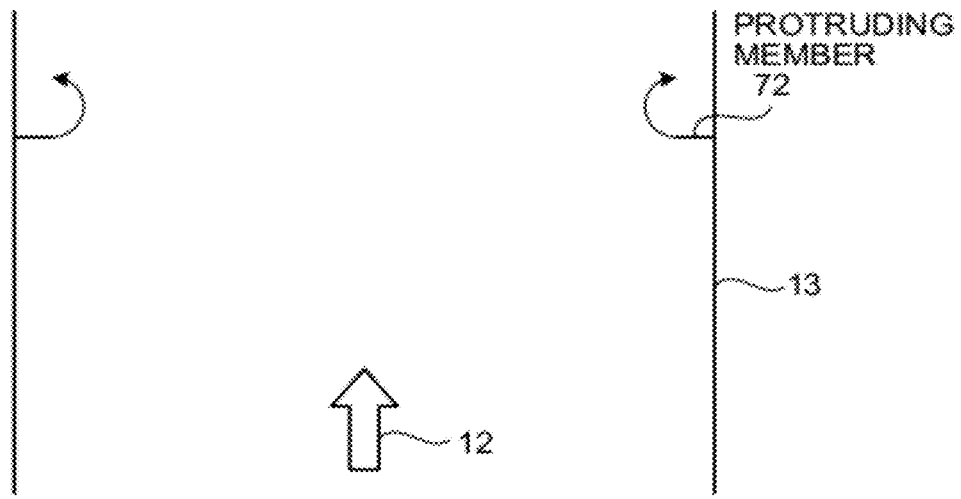
FIG. 22 is a diagram showing the flue gas duct as viewed from a long side direction thereof.

An air pollution control device according to the fifth embodiment of the present invention will be described with reference to the drawings. Since the air pollution control device according to the fifth embodiment of the present invention has a similar configuration to the air pollution control device 10 shown in FIG. 1 according to the first embodiment of the present invention, a description will be made in the present embodiment with reference to only diagrams showing a configuration of a flue gas duct. FIG. 21 is a diagram showing the flue gas duct of the air pollution control device according to the fifth embodiment of the present invention as viewed from a short side direction thereof. FIG. 22 is a diagram showing the flue gas duct as viewed from a long side direction thereof. Note that the elements overlapping with the configurations of the air pollution control devices according to the first to fourth embodiments will be denoted by the same reference numerals and the description thereof will be omitted.

As shown in FIGS. 21 and 22, in the air pollution control device according to the present embodiment, the flue gas duct 13 includes protruding members 72 provided on the inner wall of the flue gas duct 13 on the downstream side of the supply position at which the NH$_4$Cl solution 14 is supplied into the flue gas duct 13 and in the region where droplets of the NH$_4$Cl solution 14 have been gasified. An open width of the flue gas duct 13 through which the flue gas 12 can flow is reduced by providing the protruding members 72 on the inner wall of the flue gas duct 13. Thus, it is possible to generate a vortex due to the gas flow of the flue gas 12 in the vicinity of the wall surface of the flue gas duct 13. As a result, it is possible to promote the mixing of the HCl gas and the NH$_3$ gas in the flue gas 12 flowing near the wall surface of the flue gas duct 13, thereby improving the Hg oxidation ability and the NOx reducing ability in the reduction-denitration device 18.

Moreover, the installation position of the protruding member 72 is preferably set in a region where droplets of the NH$_4$Cl solution 14 sprayed from the spray nozzle 15 have already been gasified in order to prevent the droplets of the NH$_4$Cl solution 14 from colliding against the protruding member 72. Particularly, the protruding member 72 is preferably provided at 1 m or more downstream side away from the spray nozzle 15.

Moreover, although the shape of the protruding member 72 is a plate shape in the air pollution control device according to the present embodiment, the present invention is not limited thereto. Other shapes such as a box shape or a triangular shape may be used.

Sixth Embodiment

Figure 23:
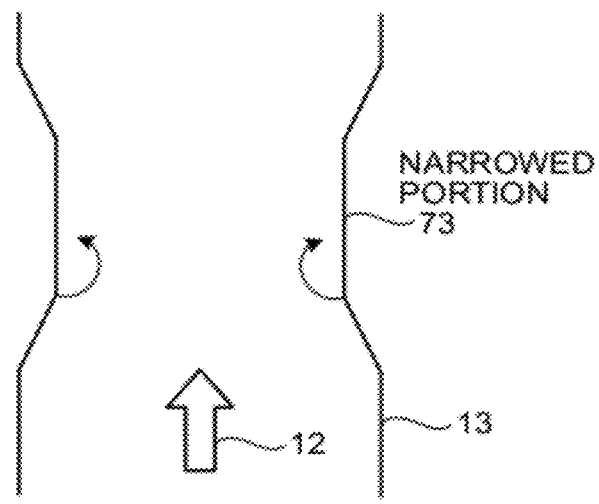
FIG. 23 is a diagram showing a flue gas duct of an air pollution control device according to a sixth embodiment of the present invention as viewed from a short side direction thereof.
Figure 24:
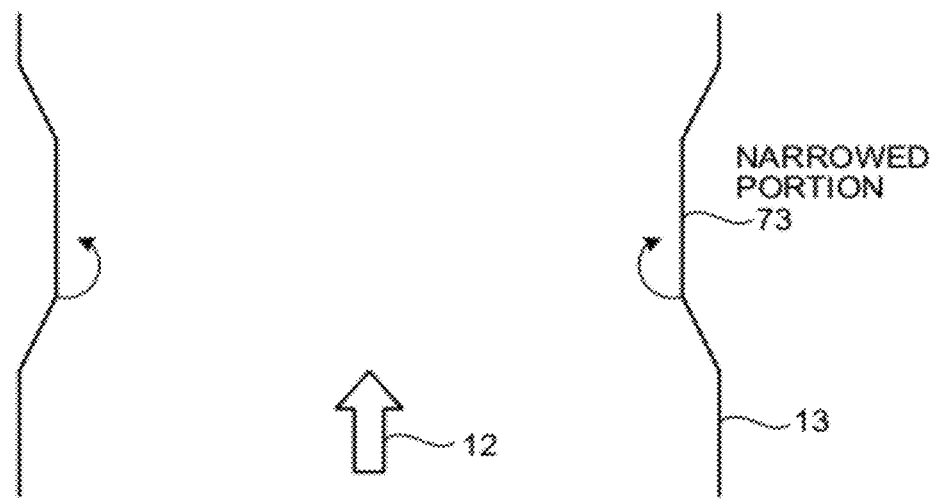
FIG. 24 is a diagram showing the flue gas duct as viewed from a long side direction thereof.

An air pollution control device according to the sixth embodiment of the present invention will be described with reference to the drawings. Since the air pollution control device according to the sixth embodiment of the present invention has a similar configuration to the air pollution control device 10 shown in FIG. 1 according to the first embodiment of the present invention, a description will be made in the present embodiment with reference to only diagrams showing a configuration of a flue gas duct. FIG. 23 is a diagram showing the flue gas duct of the air pollution control device according to the sixth embodiment of the present invention as viewed from a short side direction thereof. FIG. 24 is a diagram showing the flue gas duct as viewed from a long side direction thereof. Note that the elements overlapping with the configurations of the air pollution control devices according to the first to fifth embodiments will be denoted by the same reference numerals and the description thereof will be omitted.

As shown in FIGS. 23 and 24, the air pollution control device according to the present embodiment is formed with a narrowed portion 73 for narrowing a passage in the flue gas duct 13 provided on the downstream side of the supply position at which the $NH_4Cl$ solution 14 is supplied into the flue gas duct 13. Since the narrowed portion 73 for narrowing the passage in the flue gas duct 13 is provided on the wall surface of the flue gas duct 13, it is possible to generate a vortex due to the gas flow of the flue gas 12 in the vicinity of the wall surface of the flue gas duct 13. As a result, it is possible to promote the mixing of the HCl gas and the $NH_3$ gas in the flue gas 12 flowing near the wall surface of the flue gas duct 13. Thus, it is possible to suppress concentration unevenness of the HCl gas and the $NH_3$ gas in the flue gas 12, thereby improving the Hg oxidation ability and the NOx reducing ability in the reduction-denitration device 18.

Figure 25:
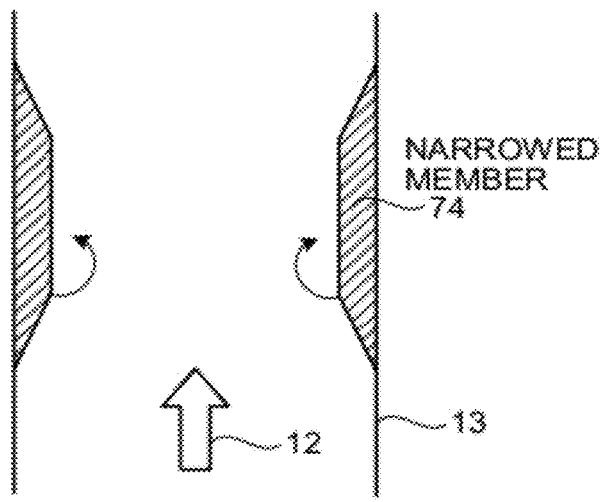
FIG. 25 is a diagram showing the flue gas duct as viewed from the short side direction thereof.
Figure 26:
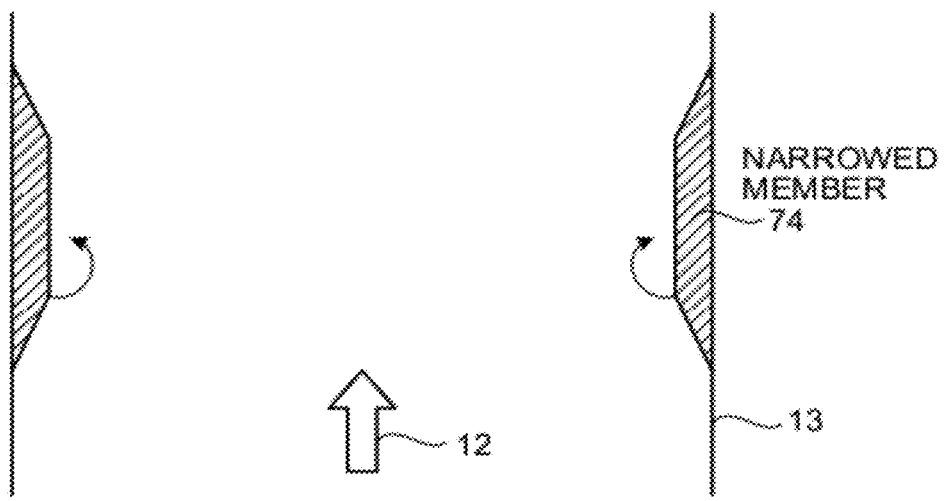
FIG. 26 is a diagram showing the flue gas duct as viewed from the long side direction thereof.

Moreover, although the passage of the flue gas duct 13 is narrowed to form the narrowed portion 73 in the air pollution control device according to the present embodiment, the present invention is not limited thereto. For example, as shown in FIGS. 25 and 26, a narrowed member 74 having the same shape as the narrowed portion 73 may be provided on the wall surface of the flue gas duct 13. Thus, it is possible to generate a vortex due to the gas flow of the flue gas 12 in the vicinity of the narrowed member 74. As a result, it is possible to promote the mixing of the HCl gas and the $NH_3$ gas in the flue gas 12 flowing near the wall surface of the flue gas duct 13.

Moreover, as with the case of the protruding member 72 in the fifth embodiment, the installation position of the narrowed portion 73 is preferably provided in the region where the droplets of the $NH_4Cl$ solution 14 sprayed from the spray nozzle 15 have already been gasified in order to prevent the droplets of the $NH_4Cl$ solution 14 from colliding against the narrowed portion 73. Particularly, the narrowed portion 73 is preferably provided at a position 1 m or more downstream side away from the spray nozzle 15.

Seventh Embodiment

Figure 27:
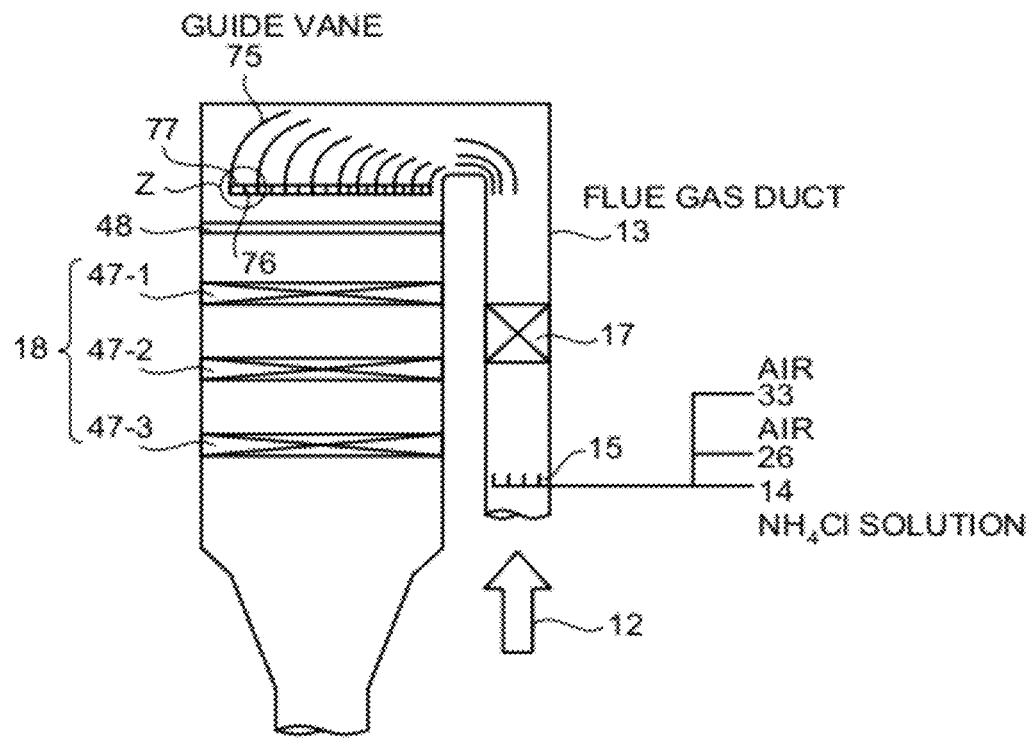
FIG. 27 is a diagram showing part of an air pollution control device according to a seventh embodiment of the present invention.
Figure 28:
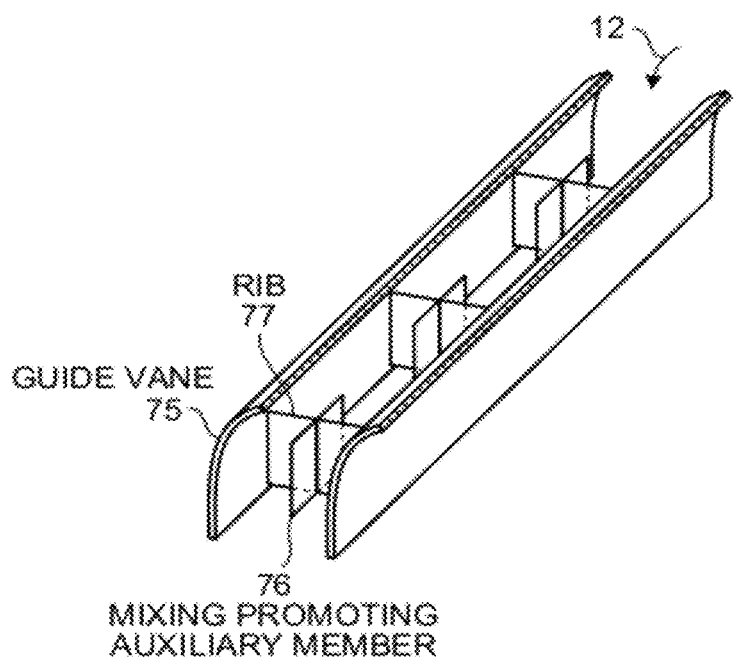
FIG. 28 is a partial enlarged perspective view showing the area of reference symbol Z in FIG. 27.

An air pollution control device according to the seventh embodiment of the present invention will be described with reference to the drawings. Since the air pollution control device according to the seventh embodiment of the present invention has a similar configuration to the air pollution control device 10 shown in FIG. 1 according to the first embodiment of the present invention, a description will be made in the present embodiment with reference to only diagrams showing a configuration of a flue gas duct. FIG. 27 is a diagram showing part of the air pollution control device according to the seventh embodiment of the present invention. FIG. 28 is a partial enlarged perspective view showing the area of reference symbol Z in FIG. 27. Note that the elements overlapping with the configurations of the air pollution control devices according to the first to sixth embodiments will be denoted by the same reference numerals and the description thereof will be omitted.

As shown in FIGS. 27 and 28, the air pollution control device according to the present embodiment is formed by providing guide vanes 75 disposed on the upstream side of the reduction-denitration device 18 with mixing promoting auxiliary members 76 for promoting the mixing of the HCl gas and the $NH_3$ gas into the flue gas 12. The mixing promoting auxiliary members 76 are a plurality of plate-shaped members extending in a direction perpendicular to ribs 77 for connecting between the plurality of guide vanes 75. By providing the ribs 77 for connecting between the guide vanes 75 with the mixing promoting auxiliary members 76, the gas flow of the flue gas 12 can be disturbed. Therefore, even when the mixing of the HCl gas and the $NH_3$ gas in the flue gas 12 is not sufficient in the mixer 17, the mixing of the HCl gas and the $NH_3$ gas in the flue gas 12 can be promoted on the upstream side of the reduction-denitration device 18. Thus, it is possible to suppress concentration unevenness of the HCl gas and the $NH_3$ gas in the flue gas 12, thereby improving the Hg oxidation ability and the NOx reducing ability in the reduction-denitration device 18.

Eighth Embodiment

Figure 29:
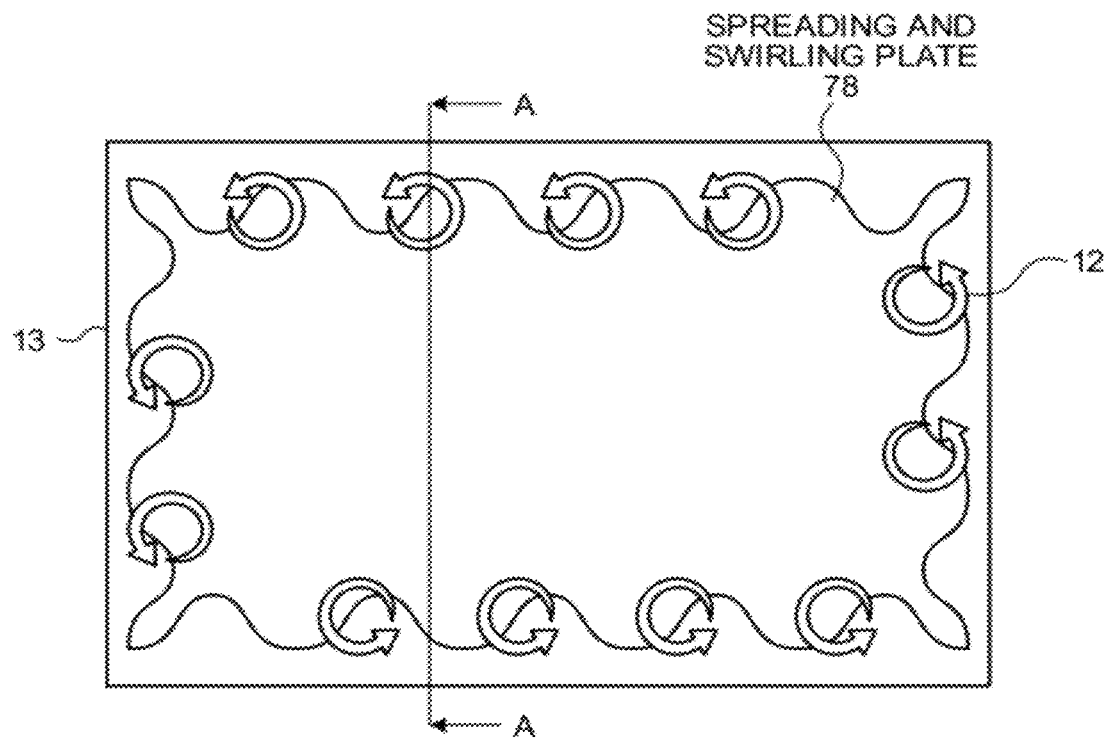
FIG. 29 is a pattern diagram showing a spreading and swirling plate in a flue gas duct of an air pollution control device according to an eighth embodiment of the present invention.
Figure 30:
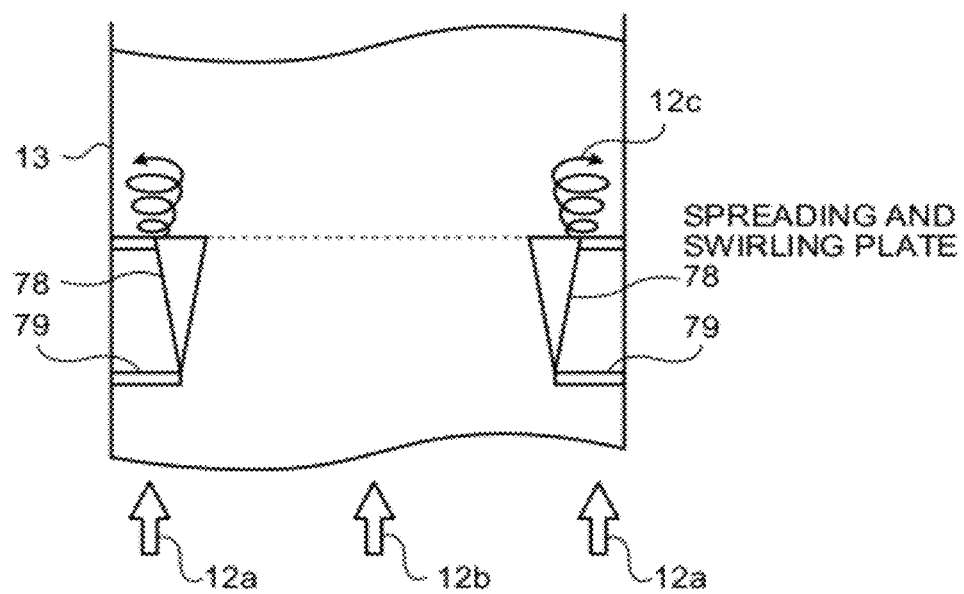
FIG. 30 is a diagram showing a cross-section taken along the line A-A in FIG. 29 in a simplified manner.
Figure 31:
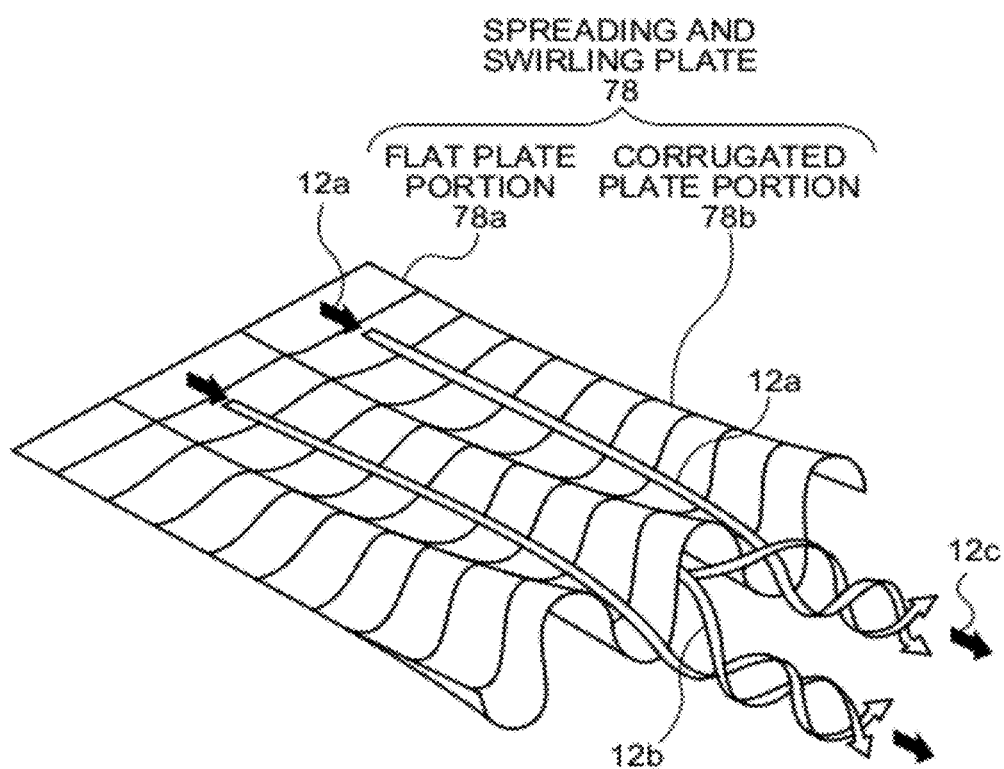
FIG. 31 is a perspective schematic diagram of the spreading and swirling plate.

An air pollution control device according to the eighth embodiment of the present invention will be described with reference to the drawings. Since the air pollution control device according to the eighth embodiment of the present invention has a similar configuration to the air pollution control device 10 shown in FIG. 1 according to the first embodiment of the present invention, a description will be made in the present embodiment with reference to only diagrams showing a configuration of a flue gas duct. FIG. 29 is a schematic diagram showing a spreading and swirling plate in the flue gas duct of the air pollution control device according to the eighth embodiment of the present invention. FIG. 30 is a diagram showing a cross-section taken along the line A-A in FIG. 29 in a simplified manner. FIG. 31 is a perspective schematic diagram of the spreading and swirling plate. Note that since the air pollution control device according to the present embodiment has a similar configuration to the air pollution control devices according to the first to seventh embodiments, identical elements will be denoted by the same reference numerals and the description thereof will be omitted.

As shown in FIGS. 29 to 31, the air pollution control device according to the present embodiment is provided with the spreading and swirling plate 78 as gas spread promoting means in the flue gas duct 13. The spreading and swirling plate 78 is formed in a flat plate shape on the upstream side in the gas flow of the flue gas 12 in the flue gas duct 13 and formed in a corrugated shape toward the downstream side in the gas flow of the flue gas 12. The spreading and swirling plate 78 is formed in such a manner that the amplitude of the corrugated shape is increased toward the downstream side in the gas flow of the flue gas 12. That is, the spreading and swirling plate 78 is composed of a flat plate portion 78a formed by a flat plate on the upstream side in the gas flow of the flue gas 12 within the flue gas duct 13, and a corrugated plate portion 78b formed in a corrugated shape toward the downstream side in the gas flow of the flue gas 12.

Moreover, as shown in FIG. 30, supporting members 79 for supporting the spreading and swirling plate 78 are provided between the spreading and swirling plate 78 and the flue gas duct 13, and the spreading and swirling plate 78 is connected, via the supporting members 79, to the inner wall of the flue gas duct 13 with the flat plate portion 78a and the corrugated plate portion 78b. Since the spreading and swirling plate 78 can be provided with a predetermined distance from the inner wall of the flue gas duct 13, the spreading and swirling plate 78 can be provided in the vicinity of the boundary between a low-concentration region in the vicinity of the inner wall of the flue gas duct 13 where the concentrations of the HCl gas and the $NH_3$ gas are low and a high-concentration region at the central portion of the flue gas duct 13 where the concentrations of the HCl gas and the $NH_3$ gas are high.

Since the spreading and swirling plate 78 can be provided with a predetermined distance from the inner wall of the flue gas duct 13, if the flue gas 12 in the flue gas duct 13 rises, a longitudinal vortex flow of the flue gas 12 can be formed in the gas flow direction of the flue gas 12 at an outlet side of the spreading and swirling plate 78 as shown in FIGS. 29 to 31. That is, in the present embodiment, a longitudinal vortex can be generated along the jet axis of the spray nozzle 15 for spraying the $NH_4Cl$ solution 14.

This longitudinal vortex flow can roll together and mix low-concentration flue gas 12a flowing near the inner wall of the flue gas duct 13 in which the concentrations of the HCl gas and the $NH_3$ gas are low and high-concentration flue gas 12b flowing through the center portion of the flue gas duct 13 in which the concentrations of the HCl gas and the $NH_3$ gas are high. In the downstream area on the outlet side of the spreading and swirling plate 78, mixed flue gas 12c in which the low-concentration flue gas 12a and the high-concentration flue gas 12b are mixed together is spread in a radial direction thereof due to a centrifugal force of this longitudinal vortex. As a result, the longitudinal vortex flow generated by the spreading and swirling plate 78 is collapsed in the downstream area on the outlet side of the spreading and swirling plate 78, thereby rapidly promoting the spread of the mixed flue gas 12c.

Therefore, since the spreading and swirling plate 78 is disposed with a predetermined distance from the inner wall of the flue gas duct 13, it is possible to further promote the mixing of the low-concentration flue gas 12a and the high-concentration flue gas 12b in the downstream area on the outlet side of the spreading and swirling plate 78 and to further promote the spreading of the HCl gas and the $NH_3$ gas. Thus, the HCl gas and the $NH_3$ gas can be spread more evenly within the flue gas duct 13. Moreover, since the HCl gas and the $NH_3$ gas can be spread evenly within the flue gas duct 13, it is possible to reduce the number of installed spray nozzles 15 for spraying the $NH_4Cl$ solution 14 and to ensure the concentration evenness of the HCl gas and the $NH_3$ gas in the flue gas duct 13 even when a distance between the nozzles is increased.

Moreover, when the spreading and swirling plate 78 is viewed from the gas flow direction of the flue gas 12, a blockage rate in the gas flow of the flue gas 12 is small and a degree of deflection in the gas flow is also small as shown in FIG. 31. Therefore, it is possible to make the pressure loss small and also to reduce a load of a fan used for blowing the flue gas 12, or the like.

Figure 32:
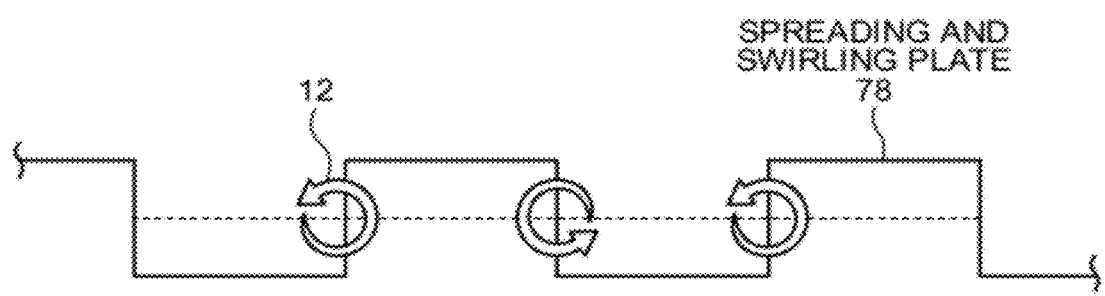
FIG. 32 is a diagram showing an installed state of another spreading and swirling plate.

Moreover, in the present embodiment, the spreading and swirling plate 78 is formed so as to change from the flat plate shape to the corrugated shape as it approaches toward the downstream side from the upstream side in the gas flow of the flue gas 12. However, the present invention is not limited thereto. FIG. 32 is a diagram showing an installed state of another spreading and swirling plate. As shown in FIG. 32, the shape of the spreading and swirling plate 78 may be a staggered rectangular shape.

Ninth Embodiment

Figure 33:
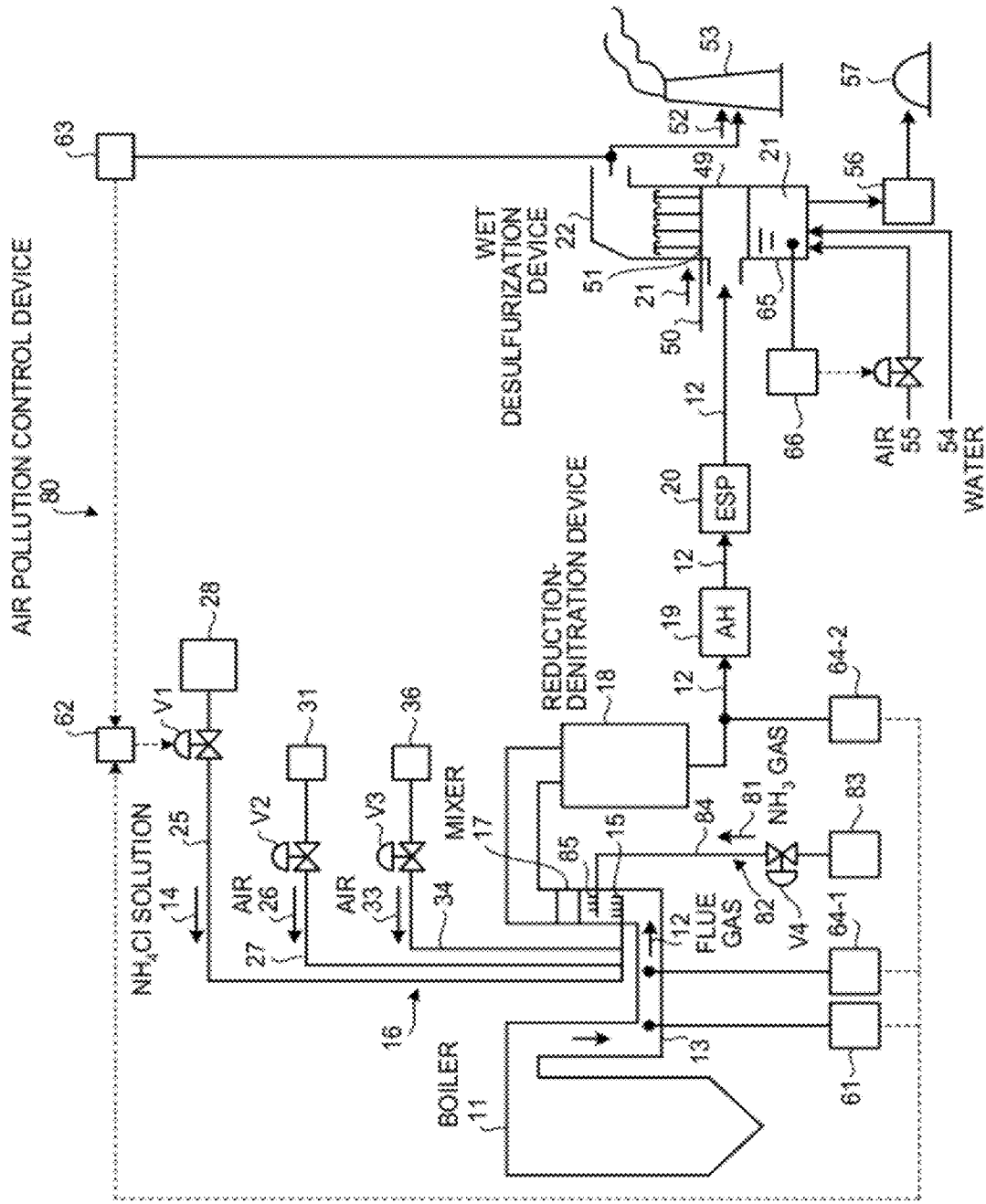
FIG. 33 is a diagram showing a configuration of an air pollution control device according to a ninth embodiment of the present invention in a simplified manner.

An air pollution control device according to the ninth embodiment of the present invention will be described with reference to the drawings. FIG. 33 is a diagram showing the configuration of a air pollution control device according to the ninth embodiment of the present invention in a simplified manner. Note that since the air pollution control device according to the present embodiment has a similar configuration to the air pollution control devices according to the first to eighth embodiments, identical elements will be denoted by the same reference numerals and the redundant description will be omitted.

As shown in FIG. 33, an air pollution control device 80 according to the present embodiment includes ammonia ($NH_3$) gas jet means 82, provided between the $NH_4Cl$ solution supply means 16 and the reduction-denitration device 18, for supplying ammonia ($NH_3$) gas 81 into the flue gas duct 13 as a reducing agent. The $NH_3$ gas jet means 82 is composed of an $NH_3$ gas supply unit 83 for storing the $NH_3$ gas 81, an ammonia ($NH_3$) gas feeding pathway 84 for feeding the $NH_3$ gas 81 to the flue gas duct 13, and a jet nozzle 85 for jetting the $NH_3$ gas 81 into the flue gas duct 13. Moreover, a jetted amount of the $NH_3$ gas 81 jetted from the jet nozzle 85 is adjusted by a valve V4. Unlike the droplets such as those of $NH_4Cl$ solution 14, the $NH_3$ gas 81 does not cause a damage such as a damage to the flue gas duct 13 even if it collides against the flue gas duct 13. Thus, the $NH_3$ gas 81 can be jetted also to a wall surface region of the flue gas duct 13. As a result, it is possible to increase the $NH_3$ concentration in the low-concentration region near the wall of the flue gas duct 13, and it is therefore possible to suppress the concentration unevenness of the HCl gas and the $NH_3$ gas in the flue gas 12.

Moreover, the position at which the $NH_3$ gas 81 is supplied into the flue gas duct 13 from the jet nozzle 85 is preferably at 1 m or more downstream side of the spray position of the $NH_4Cl$ solution 14. This is for preventing the droplets of the $NH_4Cl$ solution 14 from colliding against the jet nozzle 85.

Thus, according to the air pollution control device 80 of the present embodiment, by jetting the $NH_3$ gas 81 into the flue gas duct 13 by the $NH_3$ gas jet means 82 after spraying the $NH_4Cl$ solution 14 into the flue gas duct 13, it is possible to increase the $NH_3$ concentration in the low-concentration region near the wall of the flue gas duct 13. Thus, it is possible to suppress the concentration unevenness of the HCl gas and the $NH_3$ gas in the flue gas 12 and also to maintain the Hg oxidation ability and improve the NOx reducing ability in the reduction-denitration device 18.

<Control for Jetted Amount of $NH_3$ Gas>

The flowmeter 61 for measuring a flow rate of the flue gas 12 is provided on the upstream side of the spray nozzle 15, and a flow rate of the flue gas 12 is measured. Based on the value of the flow rate of the flue gas 12 measured by the flowmeter 61, the control device 62 can adjust the flow rate, angle, initial velocity, and the like of the $NH_3$ gas 81 jetted from the jet nozzle 85.

Thus, when the NOx concentration balance in the flue gas 12 discharged from a combustion facility such as the boiler 11 is higher than usual and the necessary amount of $NH_3$ therefore cannot be supplied only by spraying the $NH_4Cl$ solution 14 into the flue gas duct 13, the $NH_3$ gas 81 is jetted from the jet nozzle 85 into the flue gas duct 13, thereby supplying the necessary amount of $NH_3$ gas for reducing NOx to the flue gas 12. It is also possible to reduce unevenness of the concentration distributions of the HCl gas and the $NH_3$ gas supplied into the flue gas 12 within the flue gas duct 13. As a result, it is possible to suppress the concentration unevenness of the HCl gas and the $NH_3$ gas in the flue gas 12 and also to improve the Hg oxidation ability and maintain the NOx reducing ability in the reduction-denitration device 18.

Moreover, the supply amount of the $NH_3$ gas 81 supplied from the $NH_3$ gas supply unit 83 may be controlled by using the value of the NOx concentration meter 63.

Moreover, although only the $NH_3$ gas supply unit 83 is provided and the $NH_3$ gas 81 is thereby supplied into the flue gas duct 13 in the air pollution control device 80 according to the present embodiment, the present invention is not limited thereto. Instead of the $NH_3$ gas supply unit 83, a hydrogen chloride (HCl) gas supply unit for supplying a hydrogen chloride (HCl) gas into the flue gas duct 13 as an oxidizing gas may be provided, thereby supplying the HCl gas into the flue gas duct 13. As a result, it is possible to supply, to the flue gas 12, the necessary amount of HCl gas for oxidizing Hg. Moreover, based on the flow velocity of the flue gas 12 measured by the flowmeter 61, it is possible to adjust the sprayed amount, spray angle, and initial velocity of the HCl gas supplied from the HCl gas supply unit.

Furthermore, both of the $NH_3$ gas supply unit 83 and the HCl gas supply unit may be provided. Based on the flow velocity of the flue gas 12 measured by the flowmeter 61, it is possible to adjust the sprayed amounts, spray angles, and initial velocities of the $NH_3$ gas 81 and the HCl gas supplied from the $NH_3$ gas supply unit 83 and the HCl gas supply unit. With this configuration, the $NH_3$ gas and the HCl gas are separately supplied to the flue gas 12, and it is therefore possible to appropriately deal with a case where the NOx or Hg concentration in the flue gas 12 varies.

The oxidation auxiliary agent used as the oxidizing gas is not limited to HCl, and hydrogen halide other than HCl, such as hydrogen bromide (HBr) or hydrogen iodide (HI), may be used as the oxidizing gas.

INDUSTRIAL APPLICABILITY

As described above, the air pollution control device according to the present invention can promote the mixing of the HCl gas and the $NH_3$ gas, which are generated from fine droplets of the $NH_4Cl$ solution sprayed into the flue gas duct, with the flue gas. Thus, the air pollution control device according to the present invention is suitable for use as an air pollution control device for reducing the amounts of Hg and NOx in the flue gas.

REFERENCE SIGNS LIST 10, 80 air pollution control device
11 boiler
12 flue gas
13 flue gas duct
14 ammonium chloride ($NH_4Cl$) solution
15 spray nozzle
16 ammonium chloride ($NH_4Cl$) solution supply means (reduction-oxidation auxiliary agent supply means)
17 mixer (mixing means)
18 reduction-denitration device (reduction-denitration means)
19 heat exchanger (air heater)
20 precipitator
21 limestone-gypsum slurry
22 wet desulfurization device
25 ammonium chloride ($NH_4Cl$) solution supply pipe
26, 33, 55 air
27, 34 air supply pipe
28 ammonium chloride ($NH_4Cl$) solution tank
31, 36 air supply unit
32, 70 blowing pipe
35 jet hole
37 gap
41 swirling flow inductive member
42 first swirling flow inductive plate
43 second swirling flow inductive plate
44 intermediate member (connecting portion)
45 lower support plate
46 upper support plate
47-1 to 47-3 denitration catalyst layer
48 current plate
49 device body
50 absorbent feed line
51 nozzle
52 purged gas
53 stack
54 water
56 dehydrator
57 gypsum
61 flowmeter
62 control device
63 NOx concentration meter
64-1, 64-2 mercury (Hg) concentration meter
65 bottom portion
66 oxidation-reduction potential measurement control device (ORP controller)
72 protruding member
73 narrowed portion
74 narrowed member
75 guide vane
76 mixing promoting auxiliary member
77 rib
78 spreading and swirling plate
78a flat plate portion
78b corrugated plate portion
79 supporting member
81 ammonia ($NH_3$) gas
82 ammonia ($NH_3$) gas jet means
83 $NH_3$ gas supply unit
84 ammonia ($NH_3$) gas feeding pathway
85 jet nozzle
V1 to V4 valve

The invention claimed is:

1. An air pollution control device for reducing amounts of a nitrogen oxide and mercury contained in a flue gas from a boiler, the device comprising:
a reduction-oxidation auxiliary agent supply unit having a spray nozzle for spraying in a liquid state a reduction-oxidation auxiliary agent that produces an oxidizing gas and a reducing gas upon gasification thereof into a flue gas duct at a downstream of the boiler;

a mixing unit provided on a downstream side of a region where the reduction-oxidation auxiliary agent is gasified, for promoting mixing of the oxidizing gas and the reducing gas, which are produced upon the gasification of the reduction-oxidation auxiliary agent, with the flue gas;

a reduction-denitration unit including a denitration catalyst for reducing a nitrogen oxide in the flue gas with the reducing gas and for oxidizing mercury under coexistence with the oxidizing gas;

a wet desulfurization unit for reducing the amount of mercury oxidized in the reduction-denitration unit using an alkali absorbent, mixing promoting auxiliary members including a plurality of guide vanes connected to each other provided upstream of the reduction-denitration unit and downstream of the mixing unit, for promoting the mixing of the oxidizing gas and the reducing gas into the flue gas, the mixing promoting auxiliary members comprising a plurality of plate-shaped members extending in a direction perpendicular to ribs, the ribs extending between the plurality of guide vanes for disturbing the gas flow of the flue gas, and a current plate for equalizing a gas flow of the flue gas provided upstream of the reduction-denitration unit and downstream of the plurality of guide vanes, wherein the mixing unit is a spreading and swirling plate provided peripherally in the flue gas duct and formed in a flat plate shape on an upstream side in a gas flow of the flue gas in the flue gas duct and formed in a corrugated shape toward a downstream side in the gas flow of the flue gas, and the spreading and swirling plate is formed in such a way that an amplitude of the corrugated shape is increased toward the downstream side in the gas flow of the flue gas.

2. The air pollution control device according to claim 1, wherein the reduction-oxidation auxiliary agent supply unit includes an ammonium chloride solution tank.

3. The air pollution control device according to claim 1, comprising one of or both of an ammonia gas supply unit for supplying an ammonia gas into the flue gas duct and a hydrogen chloride gas supply unit for supplying a hydrogen chloride gas into the flue gas duct, which are provided between the reduction-oxidation auxiliary agent supply unit and the reduction-denitration unit.

4. The air pollution control device according to claim 1, wherein the spray nozzle includes:
a reduction-oxidation auxiliary agent supply pipe that supplies the reduction-oxidation auxiliary agent in the liquid state; and
an air supply pipe that is provided to surround the reduction-oxidation auxiliary agent supply pipe and supply air.

5. The air pollution control device according to claim 1, wherein
protruding members are provided on an inner wall of the flue gas duct so as to reduce an open width of the flue gas duct, the protruding members being provided downstream of a supply position at which the reduction-oxidation auxiliary agent is supplied into the flue gas duct; or
a narrowed portion for narrowing a passage in the flue gas duct is provided downstream of the supply position.

* * * * *